US010127704B2

(12) United States Patent
Kubo

(10) Patent No.: US 10,127,704 B2
(45) Date of Patent: Nov. 13, 2018

(54) INFORMATION PROCESSING DEVICE, PROGRAM, AND RECORDING MEDIUM

(71) Applicant: UX Innovations LLC, Kizuawa-shi, Kyoto (JP)

(72) Inventor: Hiroshi Kubo, Kizugawa (JP)

(73) Assignee: UX Innovations LLC, Kizuawa-shi, Kyoto (JP)

( * ) Notice: Subject to any disclaimer, the term of this patent is extended or adjusted under 35 U.S.C. 154(b) by 0 days.

(21) Appl. No.: 15/350,870

(22) Filed: Nov. 14, 2016

(65) Prior Publication Data

US 2017/0061665 A1 Mar. 2, 2017

Related U.S. Application Data

(63) Continuation of application No. PCT/JP2015/063319, filed on May 8, 2015.

(30) Foreign Application Priority Data

May 15, 2014 (JP) ................................ 2014-101282

(51) Int. Cl.
*G06F 3/0488* (2013.01)
*G06T 11/20* (2006.01)
(Continued)

(52) U.S. Cl.
CPC .............. *G06T 11/60* (2013.01); *G06F 3/048* (2013.01); *G06F 3/0488* (2013.01);
(Continued)

(58) Field of Classification Search
CPC .. G06F 3/048; G06F 3/04845; G06F 3/04847; G06F 3/0488; G06F 3/04883;
(Continued)

(56) References Cited

U.S. PATENT DOCUMENTS

| 2002/0128796 A1* | 9/2002 | Matsutani | G06K 9/00154 702/155 |
| 2007/0140566 A1* | 6/2007 | Lin | G06K 9/00416 382/203 |
| 2007/0274590 A1* | 11/2007 | Arai | G06F 17/30637 382/187 |

FOREIGN PATENT DOCUMENTS

| JP | 08-263688 A | 10/1996 |
| JP | 2002-099924 A | 4/2002 |

(Continued)

OTHER PUBLICATIONS

Office Action of JP 2014-101282, dated Jun. 5, 2015.
Notice of Allowance of JP 2014-101282, dated Aug. 17, 2015.
"Proposal of Next Generation Interactive whiteboard", Jun. 26, 2014, 40 pages, UX Innovations LLC.
(Continued)

*Primary Examiner* — Sing-Wai Wu
(74) *Attorney, Agent, or Firm* — Sughrue Mion, PLLC

(57) ABSTRACT

An information processing device 10 includes a command recognition unit 203, a parameter extraction unit 28 and a command execution unit 253. The command recognition unit 203 specifies one of one or more pieces of object creation processing, which include at least one of processing for creating a text box, processing for creating a figure, and table creating processing for creating a table, from a combination of directions where one polygonal line is bent, the one polygonal line being inputted as a handwriting input command to a handwriting input device that enables handwriting input onto a display screen. The parameter extraction unit 208 extracts a parameter such as a position, size and the like of a designated object from a position and length of a segment that composes one polygonal line. Thus, the information processing device 10 allows a user to give a command on a screen by handwriting.

18 Claims, 17 Drawing Sheets

(51) Int. Cl.
  *G06T 11/60* (2006.01)
  *G06F 3/048* (2013.01)
  *G06T 11/80* (2006.01)
  *G06K 9/00* (2006.01)
  *G06F 3/0484* (2013.01)
(52) U.S. Cl.
  CPC ..... *G06F 3/04883* (2013.01); *G06K 9/00416* (2013.01); *G06T 11/20* (2013.01); *G06T 11/80* (2013.01); *G06F 3/04845* (2013.01); *G06F 3/04847* (2013.01); *G06T 2200/24* (2013.01)
(58) Field of Classification Search
  CPC ..... G06K 9/00416; G06T 11/20; G06T 11/60; G06T 11/80; G06T 2200/24
  See application file for complete search history.

(56) References Cited

FOREIGN PATENT DOCUMENTS

| | | |
|---|---|---|
| JP | 2002-269579 A | 9/2002 |
| JP | 2011-0084050 A | 4/2011 |
| WO | 03/073380 A1 | 9/2003 |

OTHER PUBLICATIONS

International Written Opinion of PCT/JP2015/063319 dated Jun. 16, 2015.
International Search Report of PCT/JP2015/063319, dated Jun. 16, 2015.

* cited by examiner

Fig. 2
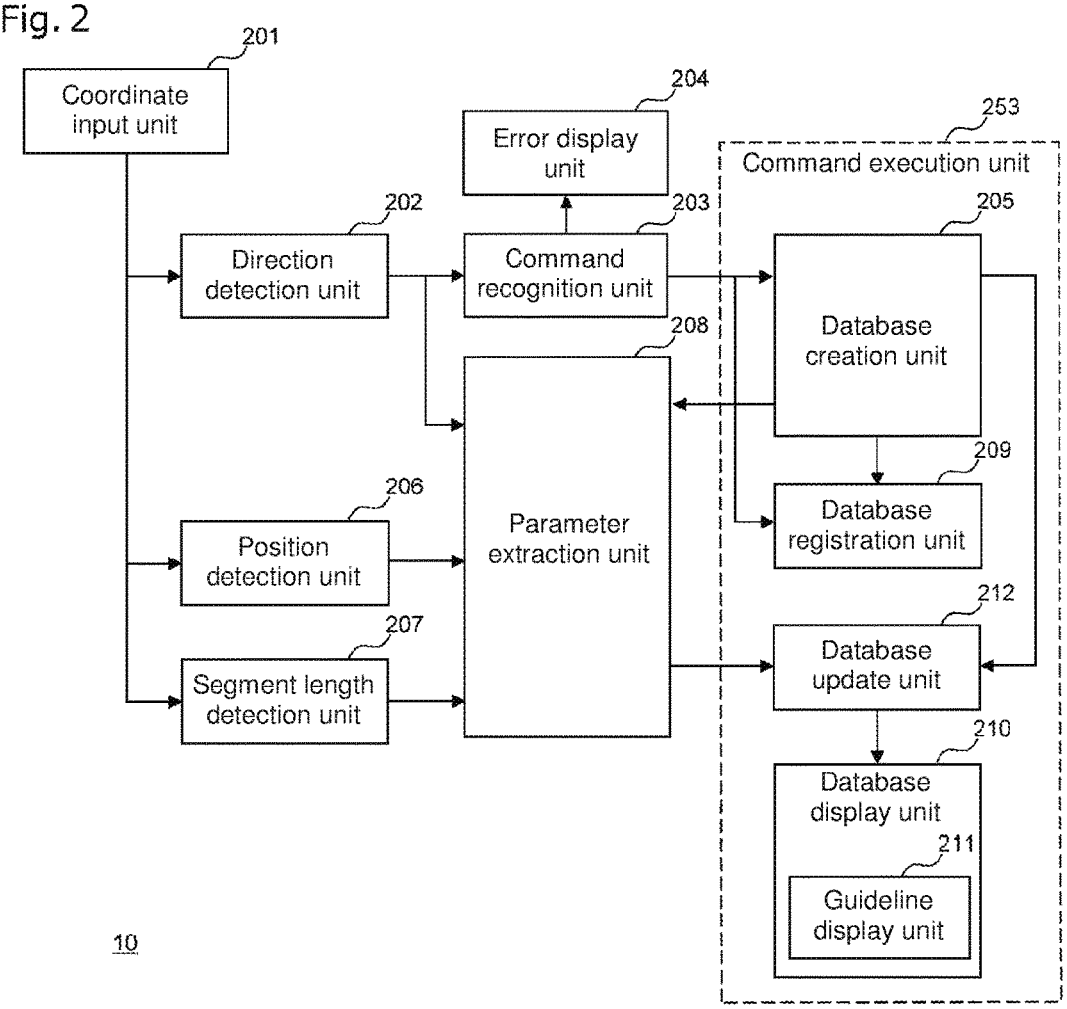
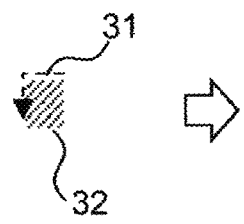
Fig. 3A
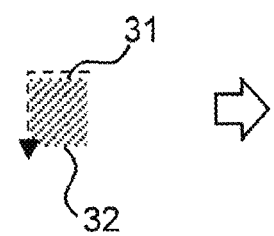
Fig. 3B
Fig. 3C

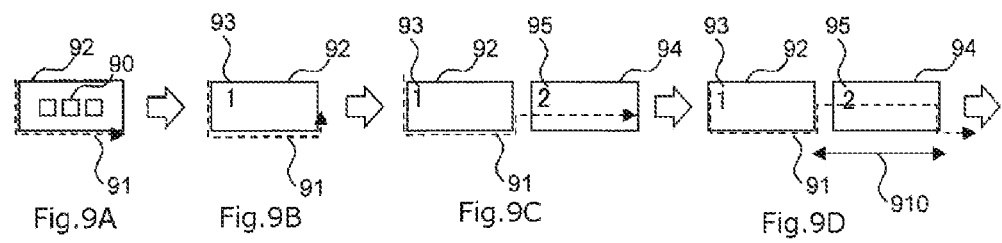
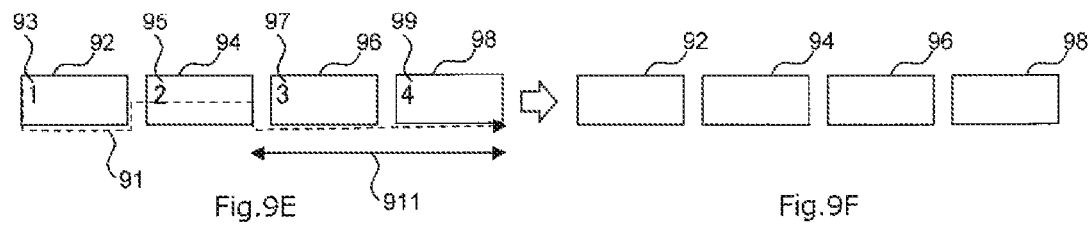
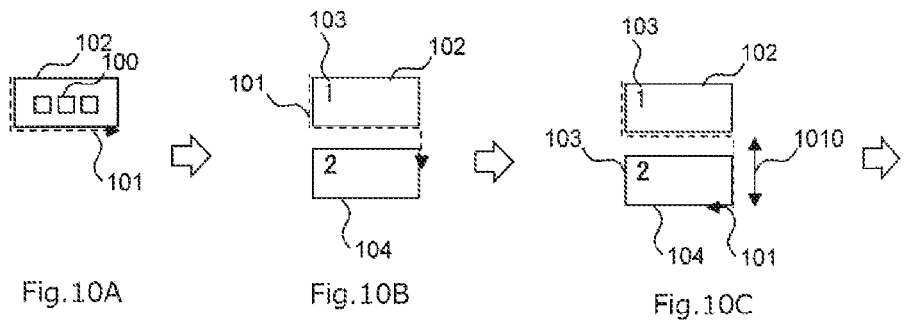
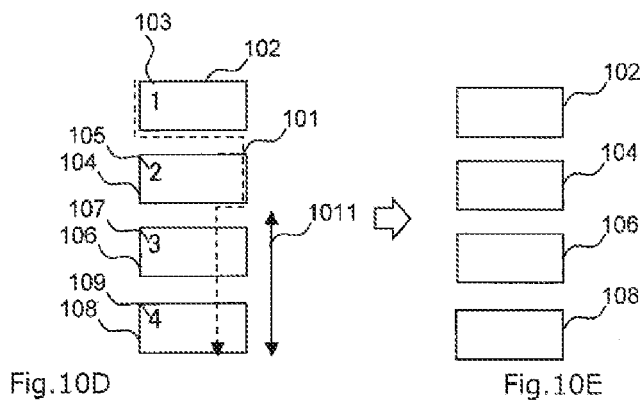

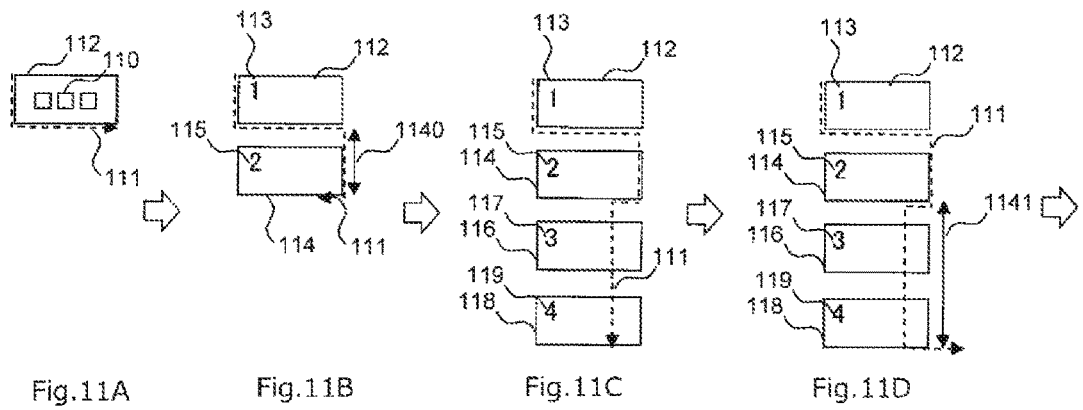
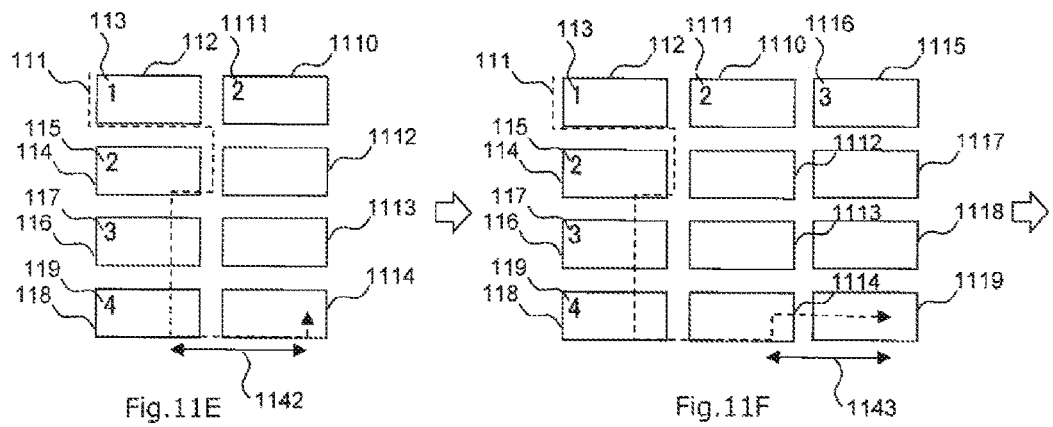
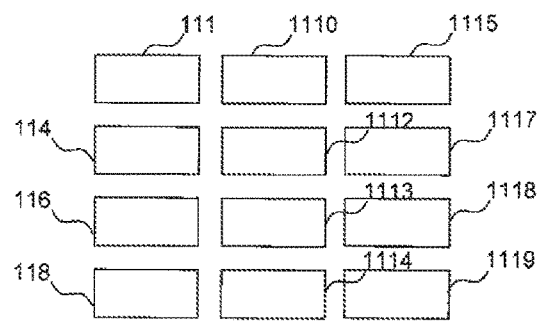
Fig.11A  Fig.11B  Fig.11C  Fig.11D  Fig.11E  Fig.11F  Fig.11G

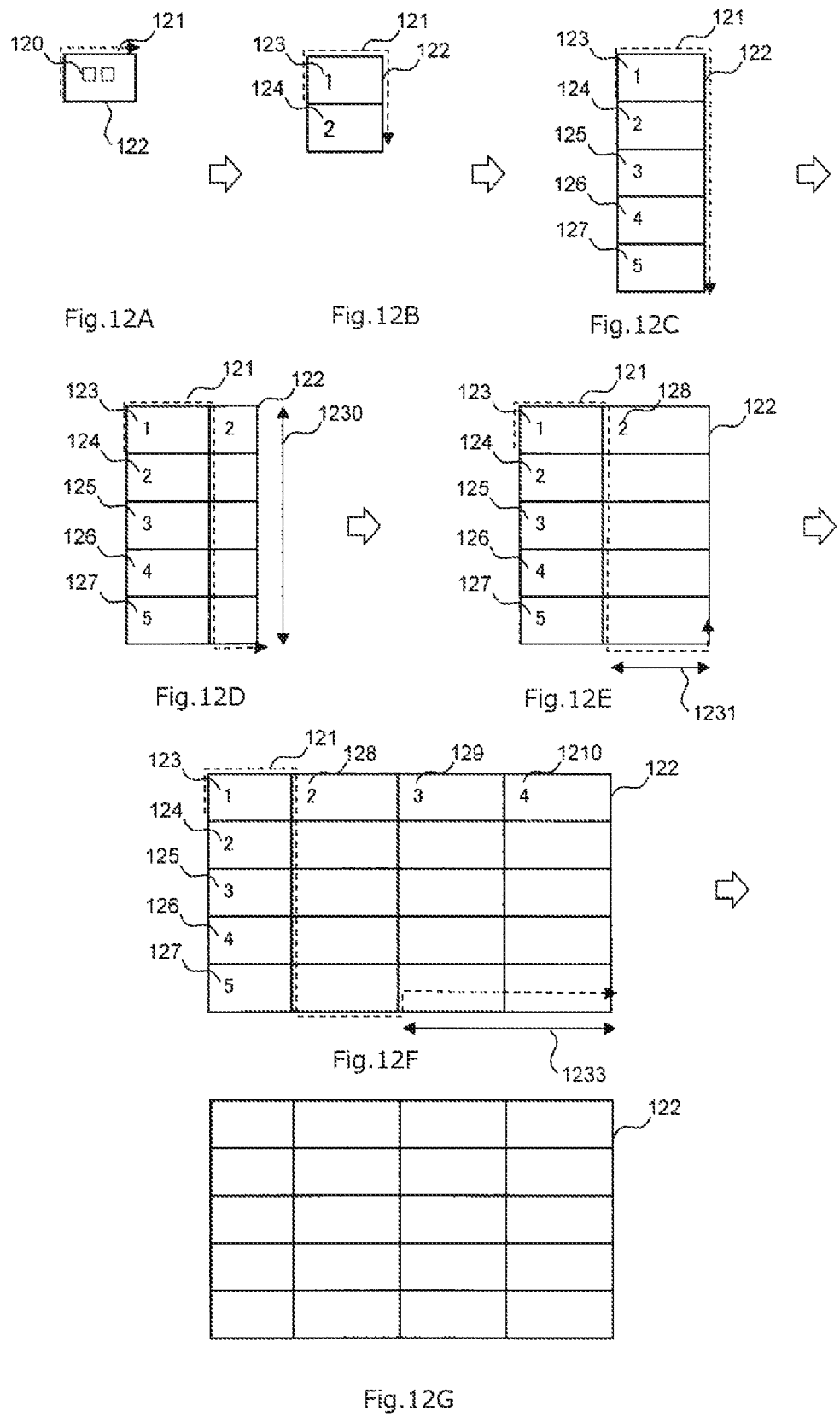

| Type of text | Horizontal writing |
|---|---|
| Position (x-coordinate, y-coordinate) | 100, 100 |
| Size of character | 10 |
| Length of character string | 0 |
| Character string | |

Fig.20

| Type of text | Vertical writing |
|---|---|
| Position (x-coordinate, y-coordinate) | 100, 100 |
| Size of character | 10 |
| Length of character string | 0 |
| Character string | |

Fig.21

| Type of text | Itemized/horizontal writing |
|---|---|
| Position (x-coordinate, y-coordinate) | 100, 100 |
| Size of character | 10 |
| Length of character string | 6 |
| Type of paragraph mark | 1.、2.、3. |
| Character string | Paragraph mark 1, line feed code, Paragraph mark 2, line feed code, Paragraph mark 3, line feed code |

Fig.22

| Type of text | Itemized/vertical writing |
|---|---|
| Position (x-coordinate, y-coordinate) | 100, 100 |
| Size of character | 10 |
| Length of character string | 6 |
| Type of paragraph mark | 一、二、三 |
| Character string | Paragraph mark 1, line feed code, Paragraph mark 2, line feed code, Paragraph mark 3, line feed code |

Fig.23

| Type of figure | Rectangle |
|---|---|
| Position (x-coordinate, y-coordinate) | 500, 500 |
| Width of figure | 200 |
| Height of figure | 100 |

Fig.24

| Type of figure | Bubble |
|---|---|
| Position (x-coordinate, y-coordinate) | 500, 500 |
| Width of figure | 200 |
| Height of figure | 100 |
| Position of bubble point | 600, 400 |

Fig.25

| Type of figure | Rectangle |
|---|---|
| Position (x-coordinate, y-coordinate) | 500, 500 |
| Width of figure | 200 |
| Height of figure | 100 |
| Interval (horizontal direction, veritical direction) | 220, 120 |
| Number (horizontal direction, veritical direction) | 4, 4 |

Fig.26

| Position (x-coordinate, y-coordinate) | 500, 500 |
|---|---|
| Height of row | 100 |
| Width of first column (width 1) | 200 |
| Widths of second and subsequent columns (width 2) | 300 |
| Number of rows | 5 |
| Number of columns | 4 |

INFORMATION PROCESSING DEVICE, PROGRAM, AND RECORDING MEDIUM

This is a Bypass Continuation of International Application No. PCT/JP2015/063319 filed May 8, 2015, claiming priority based on Patent Japanese Application No. 2014-101282 filed May 15, 2014, the contents of all of which are incorporated herein by reference in their entirety.

TECHNICAL FIELD

The present invention relates to an information processing device, a program and a recording medium for creating an object based on a handwriting input.

BACKGROUND ART

Heretofore, in a case of inputting a command to instruct creation of an object such as a text box, a figure and a table through a display screen-attached input device such as a tablet, an electronic blackboard and an interactive whiteboard, which is capable of receiving a handwriting input by a pen, a finger or the like (here in the creation, in a similar way to a case of performing the handwriting input through an input device, the created object is recorded in a storage device such as a memory, and is displayed on a display screen. Therefore, in this description, "creation" of the object is sometimes expressed as "input" thereof), there has been generally adopted a method of selecting a desired command by using the pen or the finger from a command selection menu in which a command list is disposed on a display screen, thereby selecting a type of the object for example, and thereafter, designating each parameter of the command by using the pen or the finger (for example, the parameter is a position, size or the like of the object to be selected).

However, in this method, a line of sight of a user who operates the input device frequently moves up and down and right and left, and accordingly, the user cannot concentrate on editorial work, and moreover, the operation is divided into a plurality of steps, that is, selection of the command and the designation of the position and size of the object, and accordingly, there has been a defect that working efficiency decreases. Moreover, the command selection menu occupies a part of the display screen, and accordingly, there has also been a defect that a working area cannot be ensured in a whole of the display screen. Note that, as a related technology, Patent Document 1 discloses a technology in which a command selection menu for selecting a function of an electronic pen is disposed on a display screen.

PRIOR ART DOCUMENT

Patent Document

Patent Document 1: Paragraph "0026" and FIG. 1 and FIG. 3 in Description of Japanese Patent Laid-Open Publication No. 2011-84050

SUMMARY OF THE INVENTION

Problems to be Solved by the Invention

The present invention has been made in order to solve the above-described problems, and it is an object of the present invention to provide an information processing device, a program and a recording medium, which make it possible to designate the type of the command to instruct the creation of the object and the parameter of the command easily and rapidly by handwriting without using the command selection menu.

Solutions to the Problems

In order to solve the above-described problems and to achieve the above-described object, a first aspect of the present invention is directed to an information processing device, which includes: a command recognition unit; a parameter extraction unit; a command execution unit.

The command recognition unit specifies one of one or more pieces of object creation processing, which include at least one of text box creation processing for creating a text box, figure creation processing for creating a figure, and table creation processing for creating a table, from a combination of directions where one polygonal line is bent, the one polygonal line being inputted as a handwriting input command to a handwriting input device that enables handwriting input onto a display screen.

The parameter extraction unit extracts, from a position and length of a segment composing the one polygonal line, a parameter, which corresponds to the specified object creation processing, among parameters which correspond to the one or more pieces of object creation processing and include at least one set of parameters corresponding to the at least one object creation processing out of a position and size of the text box in the text box creation processing, a position and size of the figure in the figure creation processing, and a position of the table, a height of a row, a width of a column, a number of rows and a number of columns in the table creation processing.

Moreover, the command execution unit executes the object creation processing, which is specified by the command recognition unit, based on the parameter extracted by the parameter extraction unit, and displays a created object on the display screen.

In accordance with this configuration, one of the one or more pieces of the object creation processing is specified from the combinations of the directions where one polygonal line is bent, the one polygonal line being inputted as the handwriting input command to the display screen of the handwriting input device, and the parameter such as the position and the size, which correspond to the specified object creation processing, is extracted from the position and length of the segment that composes the one polygonal line, and accordingly, the user can create the object by inputting one polygonal line by handwriting to a position of the object, which is to be created, on the display screen without using the command selection menu.

A second aspect in the present invention is directed to the information processing device according to the first aspect, wherein, even while one polygonal line as the handwriting input command is being inputted, the command recognition unit specifies the one of the one or more pieces of the object creation processing based on the one polygonal line going to be inputted. Moreover, even while the one polygonal line as the handwriting input command is being inputted, the parameter extraction unit extracts the parameter, which corresponds to the specified object creation processing, from a position and length of a segment composing the one polygonal line going to be inputted. Furthermore, even while the one polygonal line as the handwriting input command is being inputted, the command execution unit executes the object creation processing, which is specified by the command recognition unit, based on the parameter extracted by the parameter extraction unit, and displays the created object on the display screen.

In accordance with this configuration, even in a process of the handwriting input before the handwriting input of one polygonal line as the handwriting input command to the display screen is ended, the object is created based on the polygonal line that is being inputted, and is displayed on the display screen, and accordingly, the user can input the polygonal line while confirming the object going to be created.

A third aspect in the present invention is directed to a program for causing a computer to function as the command recognition unit, the parameter extraction unit and the command execution unit of the information processing device according to either one of the first and second aspects.

In accordance with this configuration, the computer is caused to execute the program, whereby the computer can be caused to function equivalently to the information processing device according to either one of the first and second aspects.

A fourth aspect in the present invention is directed to a computer-readable recording medium in which a program is recorded, wherein the program causes a computer to function as the command recognition unit, the parameter extraction unit and the command execution unit of the information processing device according to either one of the first and second aspects.

In accordance with this configuration, the computer is caused to read the recording medium, whereby the computer can be caused to function equivalently to the information processing device according to either one of the first and second aspects.

Effects of the Invention

As described above, in accordance with the present invention, it will be possible to designate the type of the command to instruct the creation of the object and the parameter of the command easily and rapidly by handwriting without using the command selection menu.

Other various aspects of the present invention and advantages thereof will be more clearly understood from the description of the embodiment of the present invention.

BRIEF DESCRIPTION OF THE DRAWINGS

FIG. 2 is a functional block diagram of the information processing device according to the embodiment of the present invention.

FIG. 3A to FIG. 3C are diagrams showing transition of a display screen by an example of a horizontal writing text box creation command.

FIG. 9A to FIG. 9F are diagrams showing transition of the display screen by an example of a plural rectangle column creation command.

FIG. 10A to FIG. 10E are diagrams showing transition of the display screen by an example of a plural rectangle row creation command.

FIG. 11A to FIG. 11G are diagrams showing transition of the display screen by an example of a plural rectangle row and column creation command.

FIG. 12A to FIG. 12G are diagrams showing transition of the display screen by an example of a table creation command.

FIG. 20 is a diagram showing an example of a database of a horizontal writing text box.

FIG. 21 is a diagram showing an example of a database of a vertical writing text box.

FIG. 22 is a diagram showing an example of a database of an itemized/horizontal writing text box.

FIG. 23 is a diagram showing an example of a database of an itemized/vertical writing text box.

FIG. 24 is a diagram showing an example of a database of a rectangular figure.

FIG. 25 is a diagram showing an example of a database of a bubble.

FIG. 26 is a diagram showing an example of a database of plural figures.

FIG. 27 is a diagram showing an example of a database of tables.

EMBODIMENTS OF THE INVENTION

Figure 1:
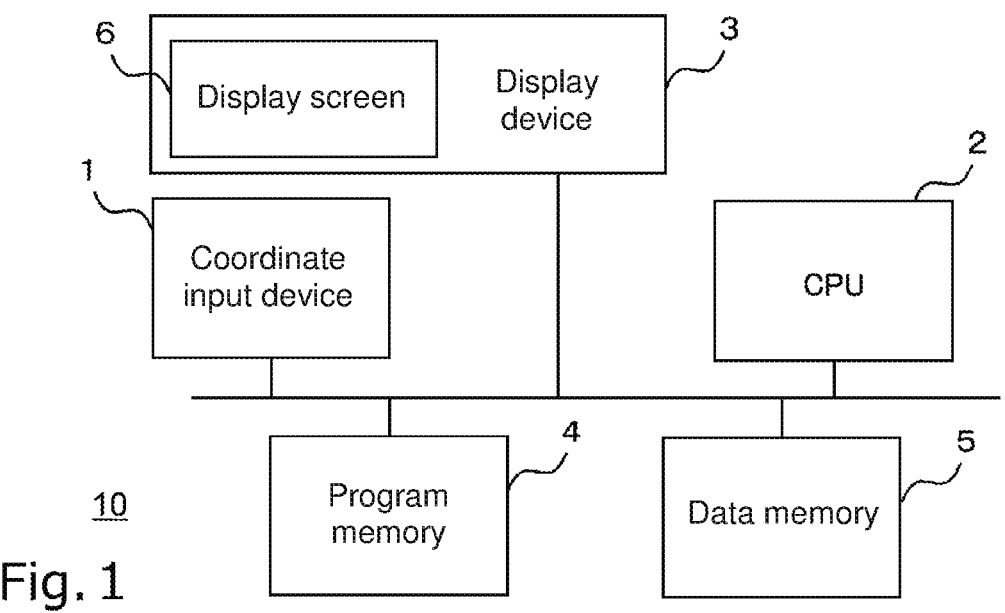
FIG. 1 is a block diagram showing a hardware configuration of an information processing device according to an embodiment of the present invention.

A description is made below in detail of a preferred embodiment of the present invention with reference to the drawings. FIG. 1 is a block diagram showing a hardware configuration of an information processing device according to the embodiment of the present invention. This information processing device 10 includes a coordinate input device 1, a central processing unit (CPU) 2, a display device 3, a program memory 4 and a data memory 5. For example, the coordinate input device 1 is a device, which includes a coordinate input mechanism of an infrared system, an electrostatic capacitance system or the like, and enables handwriting input of coordinates by a pen, a finger, a laser pointer and the like. The CPU 2 is a device that performs a variety of processing such as command recognition processing, command parameter extraction processing and command execution processing. The display device 3 is, for example, a liquid crystal display device, a projector or the like, and is a device, which includes a display screen 6, and displays characters, figures and other data on this display screen 6. The display device 3 is combined with the coordinate input device 1, and makes it possible to perform such handwriting input for the coordinates on the display screen 6 by the pen, the finger, the laser pointer and the like. The program memory 4 is a memory for storing a program for performing the variety of processing. The data memory 5 is a memory for storing data necessary to perform the variety of processing.

FIG. 2 is a block diagram showing a device configuration which the information processing device 10 realizes equivalently by cooperation between the hardware and the program, that is, is a functional block diagram of the information processing device 10. Functions of the respective units are realized in such a manner that the CPU 2 executes the program stored in the program memory 4 of FIG. 1. As shown in FIG. 2, the information processing device 10 includes a coordinate input unit 201, a direction detection unit 202, a command recognition unit 203, an error display unit 204, a database creation unit 205, a position detection unit 206, a segment length detection unit 207, a parameter extraction unit 208, a database registration unit 209, a database display unit 210, and a database update unit 212. The database display unit 210 includes a guideline display unit 211. The database creation unit 205, the database registration unit 209, the database display unit 210 and the database update unit 212 are included in a command execution unit 253 that is a specific example of a command execution unit of the present invention.

The coordinate input unit 201 has a function to detect a time series of coordinate values inputted by a user by means of the pen, the finger, the laser pointer and the like. The direction detection unit 202 has a function to analyze the time series of the coordinate values, which is detected in the coordinate input unit 201, and to detect directions of segments which compose one polygonal line inputted as a handwriting command. In such segments given by the handwriting, there can be some variations in directions such as an upper direction and a left direction. For example, the direction detection unit 202 compares some variations with a predetermined standard, and thereby detects the directions of the segments while permitting such variations. The direction detection unit 202, for example, also determines simultaneously whether or not a segment, which is long enough to detect the direction, is inputted, and then detects the directions of the segments. The direction detection unit 202 as described above is configurable by a known technology, and accordingly, a detailed description thereof is omitted.

The command recognition unit 203 has a function to compare a combination of the directions of the segments of the polygonal line, which are obtained in the direction detection unit 202, and each combination of directions of segments of a polygonal line, which composes a corresponding one of commands registered in advance, with each other, to determination whether or not the combinations coincide with each other, and to thereby recognize the command. In a case where any of the commands can be recognized, a database corresponding to the recognized command is newly created in the data memory 5 by the database creation unit 205. The database is created for each of the objects instructed to be created by the inputted command. In an event where such a new database is created, a parameter regarding the object, which should be written into the database, is initialized. In a case where the combination does not coincides with any command, and the command cannot be recognized, then by the error display unit 204, error display to the effect that the command is not recognized is displayed on the display screen 6.

The position detection unit 206 has a function to extract a position (for example, an X-coordinate and a Y-coordinate) as the parameter of the command from the time series of the coordinate values, which is detected in the coordinate input unit 201. The segment length detection unit 207 has a function to extract a length of the segment from the time series of the coordinate values, which is detected in the coordinate input unit 201. In the segment subjected to the handwriting input, as described above, there can be some variations, and accordingly, with regard to the length of the segment, for example, in a case of a segment inputted from left to right or from right to left, a length of a segment in a horizontal direction is defined as the length of the segment, and in a case of a segment inputted downward from above or upward from below, a length of a segment in a vertical direction is defined as the length of the segment. The segment length detection unit 207 as described above is configurable by a known technology, and accordingly, a detailed description thereof is omitted.

The parameter extraction unit 208 has a function to extract parameters (for example, a position of the object, a width and length of a character box, a width and height (vertical width) of a figure, a height (vertical width) of a row and a horizontal width of a column in a table, and the like) regarding the object, the parameters being to be written into the database, by using the position (for example, the X-coordinate and the Y-coordinate), which is obtained by the position detection unit 206, and by using the length of the segment, which is obtained from the segment length detection unit 207. The extraction of the parameter from the length of the segment or the like is not limited to such a case of directly defining the length of the segment or the like as the parameter. For example, a length approximately equal to the length of the segment may be defined as the parameter, or the parameter may be acquired though a certain arithmetic operation for the length of the segment or the like. Database update unit 212 has a function to write (that is, to record) the extracted parameter into the created database. In a process where one polygonal line as the command is inputted, the extraction of the parameter and the writing of the parameter into the database are carried out continuously. In the course where such parameters are extracted, if there is a preceding parameter already written into the database, then the preceding parameter is updated by a new parameter.

The database display unit 210 has a function to display a content of a current database on the display device 3. For example, a figure corresponding to the specified command and the extracted parameter is displayed on the display screen 6. The database display unit 210 includes a guideline display unit 211, and this guideline display unit 211 displays a guideline (described later) as a type of the object on the display screen 6. When the input of one polygonal line is ended, for example, when the pen or the finger is separated from the display screen 6, or when a laser beam of the laser pointer is turned off, then the command recognition unit 203 recognizes that the input of the command is ended. At this time, the content of the database is finalized by the parameter updated last. At the same time, the database registration unit 209 registers the database, of which the content is finalized, in management data (not shown) that is created in the data memory 5 and manages stored data of the data memory 5. In such a way, it becomes possible to display the object corresponding to the database of which the content is finalized, and to perform other operations as well as copy for the object.

Note that, in the information processing device 10, as an example, when a certain input is made by the pen, the finger, the laser pointer or the like on the display screen 6 of the display device 3 combined with the coordinate input device 1, then command specifying processing is performed on the recognition that the input is not handwriting input of a character, a figure or the like, but is the input of the command. In this case, at a time of inputting a character, a figure or the like other than the command by handwriting except for a case of inputting a character to the created text box, for example, an intension of this handwriting input is recognized by a certain promised operation made by the pen, the finger or the like, for example, a double tap on the display screen 6.

While referring to FIG. 3A to FIG. 3C to FIG. 12A to FIG. 12G, an illustration is made below of a shape of the polygonal line that composes the command subjected to the handwriting input, and of a content of the processing instructed by the command. In FIG. 3A to FIG. 3C to FIG. 12A to FIG. 12G, each orbit of the inputted command is shown by an arrow, and as the command is being inputted, transition of the object displayed on the display screen 6 of the display device 3 while the command is sequentially executed is also shown. Moreover, a description is made later in detail of a procedure of the processing performed by the information processing device 10, the processing following the input of the command, while referring to flowcharts of FIG. 13 to FIG. 19.

FIGS. 3A to 3C are diagrams explaining an example of a horizontal writing text box creation command to instruct the creation of the horizontal writing text box. In the example of FIG. 3A to FIG. 3C, a horizontal writing text box creation command 31 is composed of a polygonal line made of a series of two sequentially inputted segments, which are a first segment going from right to left and a second segment bent downward. At a stage of FIG. 3A, it is recognized that the command 31 is the horizontal writing text box creation command. Then, a position and vertical width of a text box which enables input of a character string are designated by a position and length (meaning a vertical length with regard to a vertical segment) of the second segment that is going to be inputted. A guideline 32 is displayed simultaneously, whereby the user can confirm a position and size of a character to be inputted. The guideline 32 is a frame for inputting a handwritten character after this command is ended. Specifically, the guideline 32 is one to display a range of the text box in an easily visible mode, and is none other than one display mode of the text box. As shown as a guideline 33 in FIG. 3C, when the input of the command 31 is ended, the displayed guideline 32 is extended to a predetermined length, whereby it becomes possible for the user to input a plurality of handwritten characters collectively by horizontal writing.

For example as mentioned above, the end of the input of the command 31 is recognized by a fact that the pen, the finger or the like, which is going to input the command 31 onto the display screen 6, is separated from the display screen 6. The same also applied to other commands illustrated below. Preferably, the handwritten characters inputted to the text box are converted into character codes in a character recognition function, and by a preselected font, are recorded as the content of "character string" in a database (FIG. 20) of the horizontal writing text box, which will be described later, and are displayed on the display screen 6. In that event, the handwritten characters may be subjected to phonetic-to-Chinese character conversion or the like by a dictionary function. Such a function may be easily realizable in such a manner that the information processing device 10 stores a well-known character recognition program and a well-known front-end processor in the program memory 4. Alternatively, such a mode is also adoptable, in which a handwritten input character is recognized as graphic data, and is recorded and displayed.

Figures 4A, 4B, 4C:
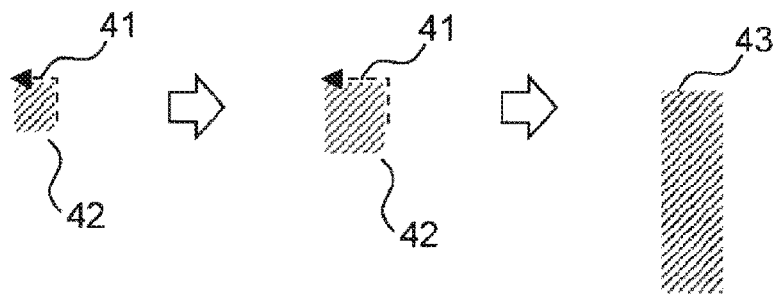
FIG. 4A to FIG. 4C are diagrams showing transition of the display screen by an example of a vertical writing text box creation command.

FIGS. 4A to 4C are diagrams explaining an example of a vertical writing text box creation command to instruct creation of a vertical writing text box. In the example of FIG. 4A to FIG. 4C, a vertical writing text box creation command 41 is composed of a polygonal line made of a series of two sequentially inputted segments, which are a first segment going upward from below and a second segment bent leftward. At a stage of FIG. 4A, it is recognized that the command 41 is the vertical writing text box creation command. Then, a position and horizontal width of a text box which enables input of a character string are designated by a position and length (meaning a horizontal length with regard to a horizontal segment) of the second segment that is going to be inputted. A guideline 42 is displayed simultaneously, whereby the user can confirm a position and size of a character to be inputted. When the input of the command 41 is ended, then as shown as a guideline 43 in FIG. 4C, the guideline 42 displayed is extended to a predetermined length, whereby it becomes possible for the user to input a plurality of handwritten characters collectively by vertical writing.

FIGS. 5A to 5F are diagrams explaining an example of an itemized/horizontal writing text box creation command to instruct creation of an itemized/horizontal writing text box. In the example of FIG. 5A to FIG. 5F, an itemized/horizontal writing text box creation command 51 is composed of a polygonal line made of a series of four sequentially inputted segments, which are a first segment going from right to left, a second segment bent downward, a third segment bent rightward, and a fourth segment bent downward. At a stage of FIG. 5A, it is recognized that the command 51, which is going to be inputted, is a command to create the horizontal writing text box, and in addition, a position and vertical width of the text box are designated by a position and length of the second segment. At the same time, a guideline 52 is displayed. By the guideline 52, the user can confirm a position and size of a character to be inputted.

Figures 5A, 5B, 5C, 5D, 5E, 5F:
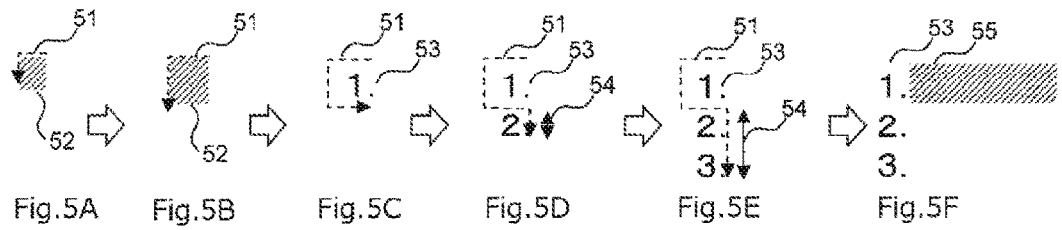
FIG. 5A to FIG. 5F are diagrams showing transition of the display screen by an example of an itemized/horizontal writing text box creation command.

At a point of time of FIG. 5C, the size of the character is finalized, in addition, it is recognized that this command 51 is the itemized/horizontal writing text box creation command, and a paragraph mark 53 is displayed in a form substituted for all or part of the guideline 52. In the example of FIG. 5A to FIG. 5F, the paragraph mark 53 is displayed in the form substituted for all of the guideline 52. Next, at stages of FIG. 5D and FIG. 5E, the number of rows, i.e., the number of stages, is designated by a length 54 of the fourth segment. Moreover, every time when the number of rows is newly designated, the paragraph mark 53 is added. By this paragraph mark 53, the user can confirm the number of rows while inputting the command 51. When the input of the command 51 is ended, then as shown as a guideline 55 in FIG. 5F, the guideline 52 is extended to a predetermined length, whereby it becomes possible for the user to input a plurality of handwritten characters collectively.

FIGS. 6A to 6F are diagrams explaining an example of an itemized/vertical writing text box creation command to instruct creation of an itemized/vertical writing text box. In the example of FIG. 6A to FIG. 6F, an itemized/vertical writing text box creation command 61 is composed of a polygonal line made of a series of four sequentially inputted segments, which are a first segment going upward from below, a second segment bent leftward, a third segment bent downward, and a fourth segment bent leftward. At a stage of FIG. 6A, it is recognized that the command 61, which is going to be inputted, is the vertical writing text box creation command, and in addition, a position and horizontal width of the text box are designated by a position and length of the second segment. At the same time, a guideline 62 is displayed. By the guideline 62, the user can confirm a position and size of a character to be inputted.

Figures 6A, 6B, 6C, 6D, 6E, 6F:
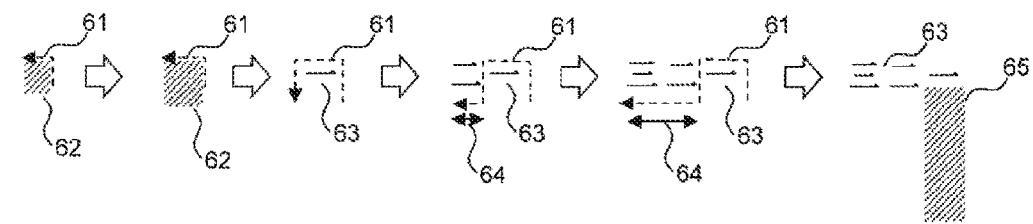
FIG. 6A to FIG. 6F are diagrams showing transition of the display screen by an example of an itemized/vertical writing text box creation command.

At a point of time of FIG. 6C, the size of the character is finalized, in addition, it is recognized that this command 61 is the itemized/vertical writing text box creation command, and a paragraph mark 63 is displayed in a form substituted for all or part of the guideline 62. In the example of FIG. 6A to FIG. 6F, the paragraph mark 63 is displayed in the form substituted for all of the guideline 62. Next, at stages of FIG. 6D and FIG. 6E, the number of columns, i.e., the number of stages, is designated by a length 64 of the fourth segment. Moreover, every time when the number of columns is newly designated, the paragraph mark 63 is added. By this paragraph mark 63, the user can confirm the number of columns while inputting the command 51. When the input of the command 61 is ended, then as shown as a guideline 65 in FIG. 6F, the guideline 62 is extended to a predetermined length, whereby it becomes possible for the user to input a plurality of handwritten characters collectively.

Figures 7A, 7B, 7C:
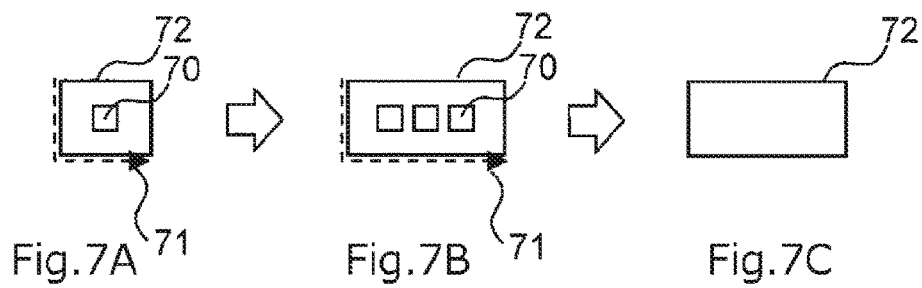
FIG. 7A to FIG. 7C are diagrams showing transition of the display screen by an example of a rectangle creation command.

FIG. 7A to FIG. 7C are diagrams explaining an example of a rectangle creation command to instruct creation of a rectangle that is one type of figures. In the example of FIG. 7A to FIG. 7C, a rectangle creation command 71 is composed of a polygonal line made of a series of two sequentially inputted segments, which are a first segment going downward from above and a second segment bent rightward. At a stage of FIG. 7A, it is recognized that the command 71, which is going to be inputted, is the rectangle creation command, in addition, a position and vertical width of a rectangle 72 are designated by a position and length of the first segment, and a horizontal width of the rectangle 72 is designated by a length of the second segment. The designated rectangle 72 is displayed on the display screen 6 at any time. At the same time, the number of characters capable of being inputted into the rectangle 72 is displayed in the rectangle 72 by a character frame 70. When the input of the command 71 is ended (FIG. 7B), a shape of the rectangle 72 is finalized. In the example of FIG. 7C, the character frame 70 is deleted after the input of the command 71 is ended. The character frame 70 is merely a figure that displays the number of characters capable of being inputted, and accordingly, though the character frame 70 is displayed as it is for a while after the input of the command 71 is ended, it is desired that the character frame 70 be deleted soon thereafter.

In FIG. 7A to FIG. 7C, an example of the rectangle creation command is shown; however, the figure is not limited to the rectangle, and it is also possible to create arbitrary figures including an ellipsoid, a polygon and others. It is possible to decide a figure, which is to be created, in advance by selecting any figure from among a menu of the figures, for example, by the pen, the finger or the like. Whichever the figure may be, it is possible to designate a position, horizontal width and vertical width of the figure by the command 71. For example, if the figure is an ellipsoidal figure, then a horizontal diameter can be designated as the horizontal width, and a vertical diameter thereof can be designated as the vertical width. A configuration itself, in which such a figure menu is displayed on the display screen 6, and the user is enabled to select the figure, has been known heretofore, and accordingly, a detailed description thereof is omitted.

Figures 8A, 8B, 8C, 8D, 8E:
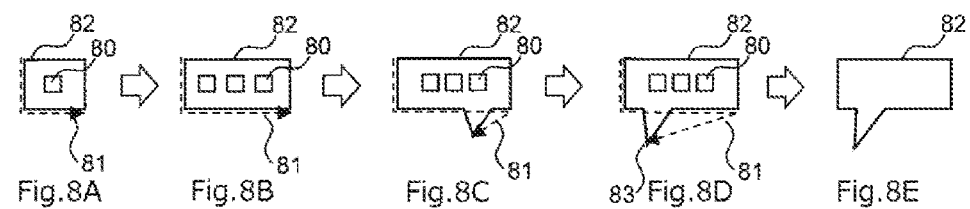
FIG. 8A to FIG. 8E are diagrams showing transition of the display screen by an example of a bubble creation command.

FIG. 8A to FIG. 8E are diagrams explaining an example of a rectangular bubble creation command to instruct creation of a rectangular bubble that is one type of the figures. In the example of FIG. 8A to FIG. 8E, a rectangular bubble creation command 81 is composed of a polygonal line made of a series of three sequentially inputted segments, which are a first segment going downward from above, a second segment bent rightward, and a third segment bent in a lower left diagonal direction. At a stage of FIG. 8A, it is recognized that the command 81, which is going to be inputted, is the rectangle creation command, in addition, a position and vertical width of a rectangle 82 corresponding to a body portion of a rectangular bubble are designated by a position and length of the first segment, and a horizontal width of the rectangle 82 is designated by a length of the second segment. The designated rectangle 82 is displayed on the display screen 6 at any time. At the same time, the number of characters capable of being inputted into the rectangle 82 is displayed in the rectangle 82 by a character frame 80. At a stage of FIG. 8C, with regard to such a rectangular bubble 82 that is no longer rectangular, a shape of a body portion of such a rectangle is finalized. At the same time, it is recognized that the command 81 is the rectangular bubble creation command. When the input of the command 81 is ended (FIG. 7D), a position of a tip end portion of a drawn portion of the rectangular bubble 82 is finalized, and a shape of the rectangular bubble 82 is also finalized. In the example of FIG. 8E, the character frame 80 is deleted after the input of the command 81 is ended.

FIG. 9A to FIG. 9F are diagrams explaining an example of a plural column rectangle creation command to instruct creation of plural column rectangles which are one type of the figures. In the example of FIG. 9A to FIG. 9F, a plural column rectangle creation command 91 is composed of a polygonal line made of a series of six sequentially inputted segments, which are a first segment going downward from above, a second segment bent rightward, a third segment bent upward, a fourth segment bent rightward, a fifth segment bent downward, and a sixth segment bent rightward. At a stage of FIG. 9A, it is recognized that the command 91, which is going to be inputted, is the rectangle creation command, in addition, a position and vertical width of a rectangle 92 are designated by a position and length of the first segment, and a horizontal width of the rectangle 92 is designated by a length of the second segment. The designated rectangle 92 is displayed on the display screen 6 at any time. At the same time, the number of characters capable of being inputted into the rectangle 92 is displayed in the rectangle 92 by a character frame 90.

At a stage of FIG. 9B, it is recognized that the command 91 is the plural column rectangle creation command. At the same time, a shape of the rectangle 92 is finalized. Moreover, at the same time, a column number 93 of the rectangle 92 is displayed on an upper left portion of the rectangle 92. In the example of FIG. 9B, the character frame 90 is deleted after the shape of the rectangle 92 is finalized.

Next, as shown in FIG. 9C, an interval between the rectangles 92 and 94 adjacent to each other is designated by a length of the fourth segment. The interval is a repetition interval of the same figure (that is, a pitch), and here, is an interval in the horizontal direction. For example, the interval between the rectangles 92 and 94 adjacent to each other corresponds to a distance between a right end of the rectangle 92 and a right end of the rectangle 94. When the interval becomes larger than a horizontal width of the rectangle 94, and a gap between the rectangles 92 and 94 adjacent to each other becomes positive, then the rectangle 94 of the second column is displayed, and a column number 95 of the rectangle 94 is also displayed simultaneously. At a stage of FIG. 9D, the interval between the rectangles 92 and 94 adjacent to each other is finalized by a finalized length 910 of the fourth segment. Next, as shown in FIG. 9E, the number of columns is designated by a length 911 of the sixth segment. Every time when the number of columns is increased, new rectangles 96 and 98 are displayed, and in addition, column numbers 97 and 99 thereof are also displayed. By the column numbers 93, 95, 97 and 99, the user can confirm the number of columns while inputting the command 91. When the input of the command 91 is ended, the number of columns is finalized as shown in FIG. 9F.

FIG. 10A to FIG. 10E are diagrams explaining an example of a plural row rectangle creation command to instruct creation of plural row rectangles which are one type of the figures. In the example of FIG. 10A to FIG. 10E, a plural row rectangle creation command 101 is composed of a polygonal line made of a series of five sequentially inputted segments, which are a first segment going downward from above, a second segment bent rightward, a third segment bent downward, a fourth segment bent leftward, and a fifth segment bent downward. At a stage of FIG. 10A, it is recognized that the command 101, which is going to be inputted, is the rectangle creation command, in addition, a position and vertical width of a rectangle 102 are designated by a position and length of the first segment, and a horizontal width of the rectangle 102 is designated by a length of the second segment. The designated rectangle 102 is displayed on the display screen 6 at any time. At the same time, the number of characters capable of being inputted into the rectangle 102 is displayed in the rectangle 102 by a character frame 100.

At a stage of FIG. 10B, it is recognized that the command 101 is the plural row rectangle creation command. At the same time, a shape of the rectangle 102 is finalized. Moreover, at the same time, a row number 103 of the rectangle 102 is displayed on an upper left portion of the rectangle 102. In the example of FIG. 10B, the character frame 100 is deleted after the shape of the rectangle 102 is finalized. At the stage of FIG. 10B, an interval between the rectangles 102 and 104 adjacent to each other is designated by a length of the third segment. As described above, the interval is a repetition interval of the same figure (that is, a pitch), and here, is an interval in the vertical direction. For example, the interval between the rectangles 102 and 104 adjacent to each other corresponds to a distance between a lower end of the rectangle 102 and a lower end of the rectangle 104. When the interval becomes larger than a vertical width of the rectangle 104, and a gap between the rectangles 102 and 104 adjacent to each other becomes positive, then the rectangle 104 of the second row is displayed, and a row number 103 of the rectangle 104 is also displayed simultaneously. In the example of FIG. 10B, at the same time when it is recognized that the command 101 is the plural row rectangle creation command, the rectangle 104 of the second row is displayed at a predetermined interval, and the row number 103 of the rectangle 104 is also displayed simultaneously. Such a mode can also be adopted for a stage of FIG. 9C in a case where there is made an input of the plural column rectangle creation command.

At a stage of FIG. 10C, the interval between the rectangles 102 and 104 adjacent to each other is finalized by a finalized length 1010 of the third segment. Next, as shown in FIG. 10D, the number of rows is designated by a length 1011 of the fifth segment. Every time when the number of rows is increased, new rectangles 106 and 108 are displayed, and in addition, row numbers 107 and 109 thereof are also displayed. By the row numbers 103, 105, 107 and 109, the user can confirm the number of rows while inputting the command 101. When the input of the command 101 is ended, the number of rows is finalized as shown in FIG. 10E.

FIG. 11A to FIG. 11G are diagrams explaining an example of a plural row and column rectangle creation command to instruct creation of plural row and column rectangles which are one type of the figures. In the example of FIG. 11A to FIG. 11G, a plural row and column rectangle creation command 111 is composed of a polygonal line made of a series of eight sequentially inputted segments, which are a first segment going downward from above, a second segment bent rightward, a third segment bent downward, a fourth segment bent leftward, a fifth segment bent downward, a sixth segment bent rightward, a seventh segment bent upward, and an eighth segment bent rightward. At stages of FIG. 11A to FIG. 11C, the command 111, which is going to be inputted, is recognized to be the command 101 shown in FIG. 10A to FIG. 10E, and the processing of FIG. 10A to FIG. 10D is advanced.

That is to say, at the stage of FIG. 11A, a position and vertical width of the rectangle 112 is designated by a position and length of the first segment, and a horizontal width of the rectangle 112 are designated by a length 111 of the second segment. The designated rectangle 102 is displayed on the display screen 6 at any time. At the same time, the number of characters capable of being inputted into the rectangle 112 is displayed in the rectangle 112 by a character frame 110. At the stage of FIG. 11B, an interval between the rectangles 112 and 114 adjacent to each other is finalized by a finalized length 1140 of the third segment. Row numbers 113 and 115 are also displayed simultaneously on the rectangles 112 and 114, respectively.

At the stage of FIG. 11C, the number of rows is designated by the length 111 of the fifth segment. Every time when the number of rows is increased, new rectangles 116 and 118 are displayed, and in addition, row numbers 117 and 119 thereof are also displayed. At a stage of FIG. 11D, the number of rows is finalized by a finalized length 1141 of the fifth segment. At the same time, it is recognized that the inputted command 111 is the plural row and column rectangle creation command. An interval between the rectangles arrayed horizontally is designated by a length of the sixth segment.

At a stage of FIG. 11E, the interval between the rectangles arrayed horizontally is finalized by a finalized length 1142 of the sixth segment. In the example of FIG. 11E, the interval between the rectangles arrayed horizontally, that is, a repetition interval of the rectangles in the horizontal direction (that is, a pitch) is determined so as to coincide with the length 1142 of the segment. In contrast, such a horizontal interval between the rectangles may also be determined by a length of a portion beyond a right end of a rectangle 118 in the length 1142 of the horizontal segment. Anyway, the horizontal interval is extracted from the length 1142 of the segment. Moreover, for example, in the process of FIG. 11D, at a stage where the horizontal interval becomes larger than the horizontal width of the rectangle 1114, and the gap between the rectangles adjacent to each other becomes positive, rectangles 1110, 1112, 1113 and 1114 of the second columns are displayed, and a column number 1111 of the second column is also displayed. In the example of FIG. 11E, the column number 1111 is displayed on only the rectangle 1110 of the first row.

Next, at a stage of FIG. 11F, the number of columns is designated by a length 1143 of the eighth segment. Every time when the number of columns is increased, new rectangles, for example, rectangles 1115, 1117, 1118 and 1119 of the third column are displayed, and in addition, a column number 1116 thereof is displayed. By these column numbers, the user can confirm the number of columns while inputting the command 111. When the input of the command 111 is ended, the number of rows and columns is finalized as shown in FIG. 11G.

FIG. 12A to FIG. 12G are diagrams explaining an example of a table creation command to instruct creation of a table. In the example of FIG. 12A to FIG. 12G, a table creation command 121 is composed of a polygonal line made of a series of six sequentially inputted segments, which are a first segment going upward from below, a second segment bent rightward, a third segment bent downward, a fourth segment bent rightward, a fifth segment bent upward, and a sixth segment bent rightward. In FIG. 12A to FIG. 12G, reference numeral 122 denotes a table displayed on the display screen 6 at each stage where the command 121 is inputted.

At a stage of FIG. 12A, it is recognized that the command 121, which is going to be inputted, is the table creation command, in addition, a position and vertical width of a cell of a first row and a first column are designated by a position and length of the first segment, and a horizontal width of the cell of the first row and the first column is designated by a length of the second segment. A cell 122 of the first row and the first column, in which the position etc. are designated, is displayed on the display screen 6 at any time. At the same time, the number of characters capable of being inputted into the cell of the first row and the first column is displayed in the cell of the first row and the first column by a character frame 120.

At a stage of FIG. 12B, a shape of the cell of the first row and the first column is finalized. Following this finalization, a row number 123 is displayed in the cell of the first row and the first column. In the example of FIG. 12A to FIG. 12G, it is assumed that shapes of cells of the respective columns of the first row are common to one another, and accordingly, at the same time when the shape of the cell of the first row and the first column is finalized, the shapes of the cells of the respective columns of the first row are also finalized. The character frame 120 is deleted, for example, after the shape of the cell of the first row and the first column is finalized. At the stages of FIG. 12B and FIG. 12C, the number of rows is designated by a length of the third segment. Every time when the number of rows is newly designated, cells of rows corresponding thereto are newly displayed. On the respective rows of the displayed first column, row numbers 123 to 127 are displayed. By the row numbers 123 to 127 thus displayed, the user can input the command 121 while confirming the number of rows.

At a stage of FIG. 12D, the number of rows is finalized by a finalized length 1230 of the third segment. At the stage of FIG. 12D, a horizontal width of cells of the second column is designated by a length of the fourth segment. At the same time, the cells of the second column having the designated horizontal width are displayed, and a column number 128 indicating the second column is also displayed. In the example of FIG. 12D, the column number 128 is displayed on the first row.

At a stage of FIG. 12E, a horizontal width of the cell of the second column is finalized by a finalized length 1231 of the fourth segment. In the example of FIG. 12A to FIG. 12G, it is assumed that horizontal widths of the second and subsequent columns are common to one another, and accordingly, at the same time when the horizontal width of the second column is finalized, the horizontal widths of the respective columns subsequent to the second column are also finalized.

At a stage of FIG. 12F, the number of columns is designated by a length 1233 of the sixth segment. At the same time, cells of the designated number of columns are displayed, and the column numbers 128, 129 and 1210 are also displayed. By the column numbers 128, 129 and 1210 thus displayed, the user can input the command 121 while confirming the number of columns. When the input of the command 121 is ended, then the number of columns is finalized, and as shown in FIG. 12G, such a table 122 of the finalized number of rows and columns is displayed.

As described above, in the information processing device 10, the simple polygonal line is manually inputted as the command onto the display screen 6, whereby there can be designated the types, positions, sizes, number, interval and the like of the variety of objects to be created. In addition, the object to be created can be designated at the position of the object on the display screen 6. Moreover, as the width of the object, for example, can be designated by the length of the polygonal line in the direction thereof, the size, number, interval and the like of the object are designated by the direction and length of the segment associated therewith so as to be easily and visually recognizable. Moreover, the number of polygonal lines is reduced to the number necessary to designate the object. Thus, the information processing device 10 makes it possible to designate the desired object by the manual operation that is visually and easily recognizable and simple.

Figure 13:
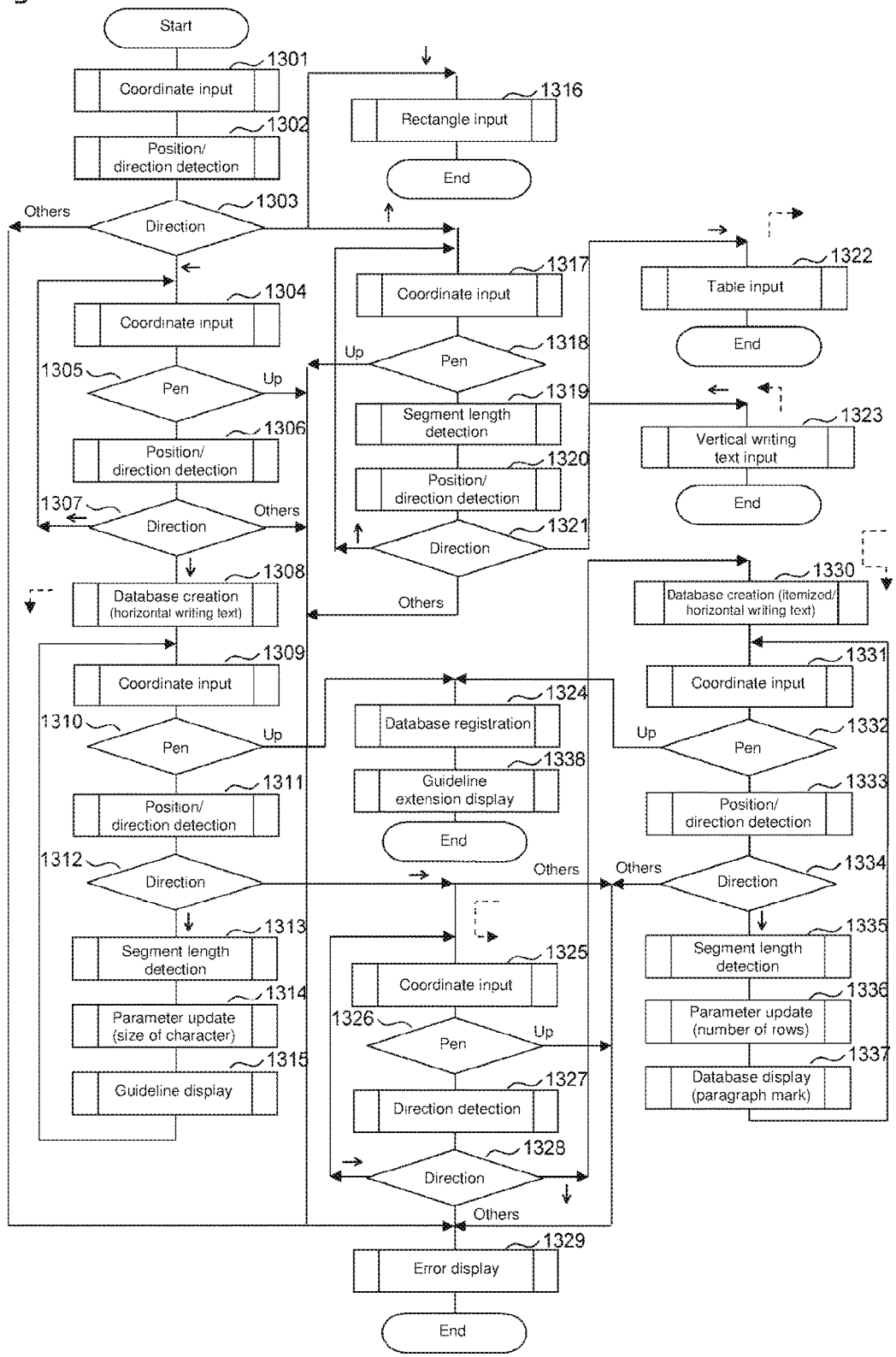
FIG. 13 is a flowchart showing command recognition processing, and showing processing by the horizontal writing text box creation command and the itemized/horizontal writing text box creation command.

FIG. 13 is a flowchart showing command recognition processing and a subsequent processing procedure for the horizontal writing text creation command and the itemized/horizontal text creation command. Which portion of the device illustrated in FIG. 2 executes each piece of the processing illustrated in the flowcharts of FIG. 13 and subsequent thereto is self-obvious for those skilled in the art from a content of the processing and the description of FIG. 2, and accordingly, a point-by-point description on a subject performing each processing is omitted.

When the processing is started, and the coordinate input unit 201 (FIG. 2) detects the input of the coordinates by the pen, the finger or the like in coordinate input 1301, then in position/direction detection 1302, the position and the direction are detected based on the inputted coordinates. In a case where it is determined that the detected direction is the downward direction in direction determination 1303 which follows, then the processing proceeds to rectangle input 1316. In a case where the detected direction is the upward direction, the processing proceeds to coordinate input 1317, segment length detection 1319 and position/direction detection 1320, and the next direction detection is performed. In a case where it is determined in direction determination 1321 that the direction detected in the position/direction detection 1320 is the upward direction (that is, no change occurs), then the processing returns to the coordinate input 1317, and in a case where it is determined that the detected direction is the right direction, it is recognized that a table input command is inputted, and the processing proceeds to table input (that is, table creation) 1322. In a case where the direction detected in such direction detection 1320 is the left direction, it is recognized that a vertical writing text input (that is, vertical writing text box creation) command is inputted, and the processing proceeds to vertical writing text input 1323. In a case where it is determined in pen-up determination 1318 that the pen, the finger or the like is lifted, for example, by a fact that the coordinate input is discontinued in the coordinate input 1317, then the inputted polygonal line differs from any of the combinations of the polygonal lines, which are registered in advance, and accordingly, by error display 1329, a command error is displayed (for example, the inputted polygonal line is displayed in a blinking manner) on the display screen 6.

Next, in a case where it is determined in the direction determination 1303 that the detected direction is the left direction, then the processing proceeds to coordinate input 1304 and position/direction detection 1306, where new position/direction detection is performed. When it is determined in direction determination 1307 that the direction detected in the position/direction detection 1306 is the left direction, that is, no change occurs, then the processing returns to the coordinate input 1304. In a case where it is determined in the direction determination 1307 that the detected direction is the downward direction, then it is recognized that a horizontal writing text input (that is, horizontal writing text box creation) command is inputted, and in database creation 1308, a database of the horizontal writing text, which is illustrated in FIG. 20, is created. The database is created in the data memory 5 (FIG. 1). At this time, the position of the character to be subjected to the handwriting input, that is, the position of the text box is stored in the database. For example, this position is a position of a starting point of a second polygonal line, which is detected in the position/direction detection 1306. If it is determined that the pen, the finger or the like is lifted on the way (pen-up determination 1305), or that the detected direction is not any of the above ("others" in the direction determination 1307), then it is determined that the command is unrecognizable, and a command error is displayed on the display screen 6 (error display 1329).

After the database creation 1308, the processing proceeds to coordinate input 1309, position/direction detection 1311 and segment length detection 1313, and a length of a vertical segment of the command, which is associated with the size of the character to be inputted, that is, the vertical width of the text box, is detected. In parameter update 1314 which follows, a parameter "size of character" of the above-described database is updated based on the detected size of the character, and in guideline display 1315, the position and size of the character are displayed as a guideline on the display screen 6. Thereafter, the processing returns to the coordinate input 1309. In a case where it is determined that the pen, the finger or the like is lifted on the way ("up" in pen-up determination 1310), it is determined that the input of the command is ended, and the above-described database is registered in database registration 1324, and in addition, the guideline displayed is extended on the display screen 6 in guideline extension display 1338.

In a case where it is determined in direction determination 1312 that the direction detected in the position/direction detection 1311 is the right direction, the processing proceeds to coordinate input 1325 and direction detection 1327, and new direction detection is performed. When it is determined in direction determination 1328 that the direction detected in the direction detection 1327 is the right direction (that is, no change occurs), the processing returns to the coordinate input 1325, and in a case where it is determined that the detected direction is the downward direction, it is recognized that the itemized/horizontal writing text input (that is, itemized/horizontal writing text box creation) command is inputted, and in database creation 1330, a database that defines the itemized/horizontal writing text box, which is illustrated in FIG. 22 is created. At this time, the position and size of the character, which are calculated in the position/direction detection 1311 and the segment length detection 1313, are stored in this database. If it is determined that the pen, the finger or the like is lifted on the way ("up" in pen-up determination 1326), or that the detected direction is not either the right direction or the downward direction ("others" in the direction determination 1328), then it is determined that the command is unrecognizable, and the command error is displayed on the display screen 6 (error display 1329).

After the database creation 1330, the processing proceeds to coordinate input 1331, position/direction detection 1333 and segment length detection 1335, and the length of the vertical segment of the command is detected. Thereafter, in parameter update 1336, "number of rows" (recorded as the number of paragraph marks of "character string"), which is a parameter of the above-described database, is updated, and the paragraph mark is displayed on the display screen 6 in database display 1337. In a case where it is determined that the pen, the finger or the like is lifted on the way ("up" in pen-up determination 1332), it is determined that the input of the command is ended, and the above-described database is registered in the database registration 1324, and in addition, the guideline displayed is extended on the display screen 6 in the guideline extension display 1338. Note that, in the case where it is determined that the direction of the segment is "others" in the direction determinations 1303, 1312 and 1334, it is determined that the command is unrecognizable, and the command error is displayed on the display screen 6.

Figure 14:
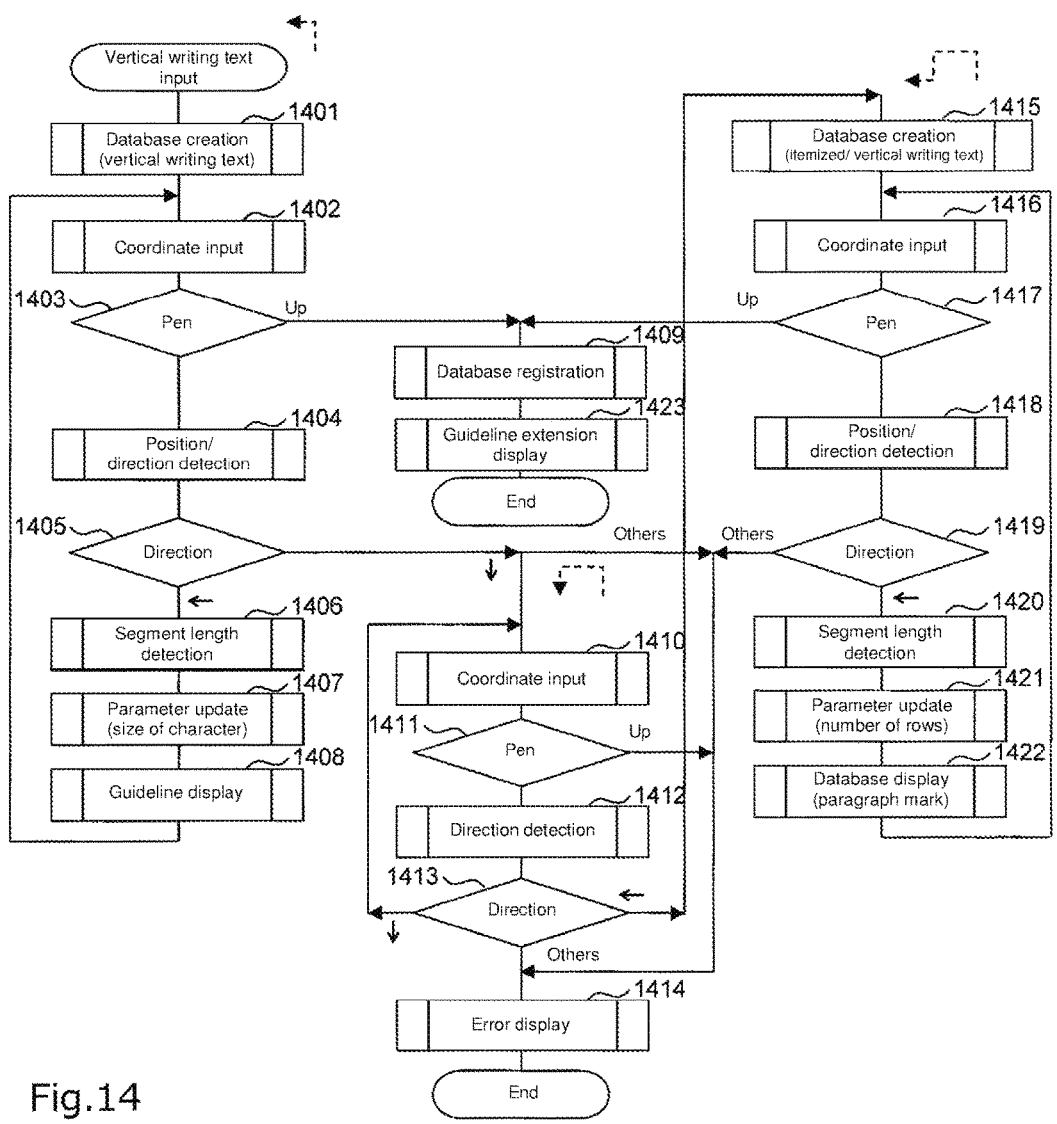
FIG. 14 is a flowchart showing processing by the vertical writing text box creation command and the itemized/vertical writing text box creation command.

FIG. 14 is a flowchart showing a processing procedure for a vertical writing text creation command and an itemized/vertical writing text creation command. After the processing proceeds to the vertical writing text input 1323 of FIG. 13, the database, which is illustrated in FIG. 21 and defines the vertical writing text box, is created in database creation 1401 of FIG. 14. At this time, the position of the starting point of the second polygonal line, which is detected in the position/direction detection 1320 (FIG. 13), is stored as the position of the character (that is, the position of the text box) in the database.

After the database creation 1401, the processing proceeds to coordinate input 1402, position/direction detection 1404 and segment length detection 1406, and the length of the horizontal segment of the command, that is, the size of the character is detected. In parameter update 1407 which follows, a parameter (the size of the character) of the above-described database is updated, and in guideline display 1408, the position and size of the character are displayed on the display screen 6. Thereafter, the processing returns to the coordinate input 1402. In a case where it is determined that the pen, the finger or the like is lifted on the way ("up" in pen-up determination 1403), it is determined that the input of the command is ended, and the above-described database is registered in database registration 1409, and in addition, the guideline displayed is extended on the display screen 6 in guideline extension display 1423.

In a case where it is determined in the direction determination 1405 that the direction detected in the position/direction detection 1404 is the downward direction, the processing proceeds to coordinate input 1410 and direction detection 1412, and new direction detection is performed.

When it is determined in direction determination 1413 that the direction detected in the direction detection 1412 is the downward direction (that is, no change occurs), the processing returns to the coordinate input 1410, and in a case where it is determined that the detected direction is the left direction, it is recognized that the itemized/vertical writing text input (that is, itemized/vertical writing text box creation) command is inputted, and in database creation 1415, a database that defines the itemized/vertical writing text box, which is illustrated in FIG. 23 is created. At this time, the position of the character, which is detected in the position/direction detection 1320 (FIG. 13), and the size of the character, which is calculated in the segment length detection 1406, are stored in the database. If it is determined that the pen, the finger or the like is lifted on the way ("up" in pen-up determination 1411), or that the detected direction is not either the left direction or the downward direction ("others" in the direction determination 1413), then it is determined that the command is unrecognizable, and the command error is displayed on the display screen 6 in error display 1414.

After the database creation 1415, the processing proceeds to coordinate input 1416, position/direction detection 1418 and segment length detection 1420, and the length of the horizontal segment of the command is detected. Thereafter, in parameter update 1421, "number of columns" (recorded as the number of paragraph marks of "character string"), which is a parameter of the above-described database, is updated, and the paragraph mark is displayed on the display screen 6 in database display 1422. In a case where it is determined that the pen, the finger or the like is lifted on the way ("up" in pen-up determination 1417), it is determined that the input of the command is ended, and the above-described database is registered in database registration 1409, and in addition, the guideline displayed is extended on the display screen 6 in guideline extension display 1423. Note that, in a case where it is determined that the direction of the segment is "others" in the direction determinations 1405 and 1419, it is determined that the command is unrecognizable, and the command error is displayed on the display screen 6.

Figure 15:
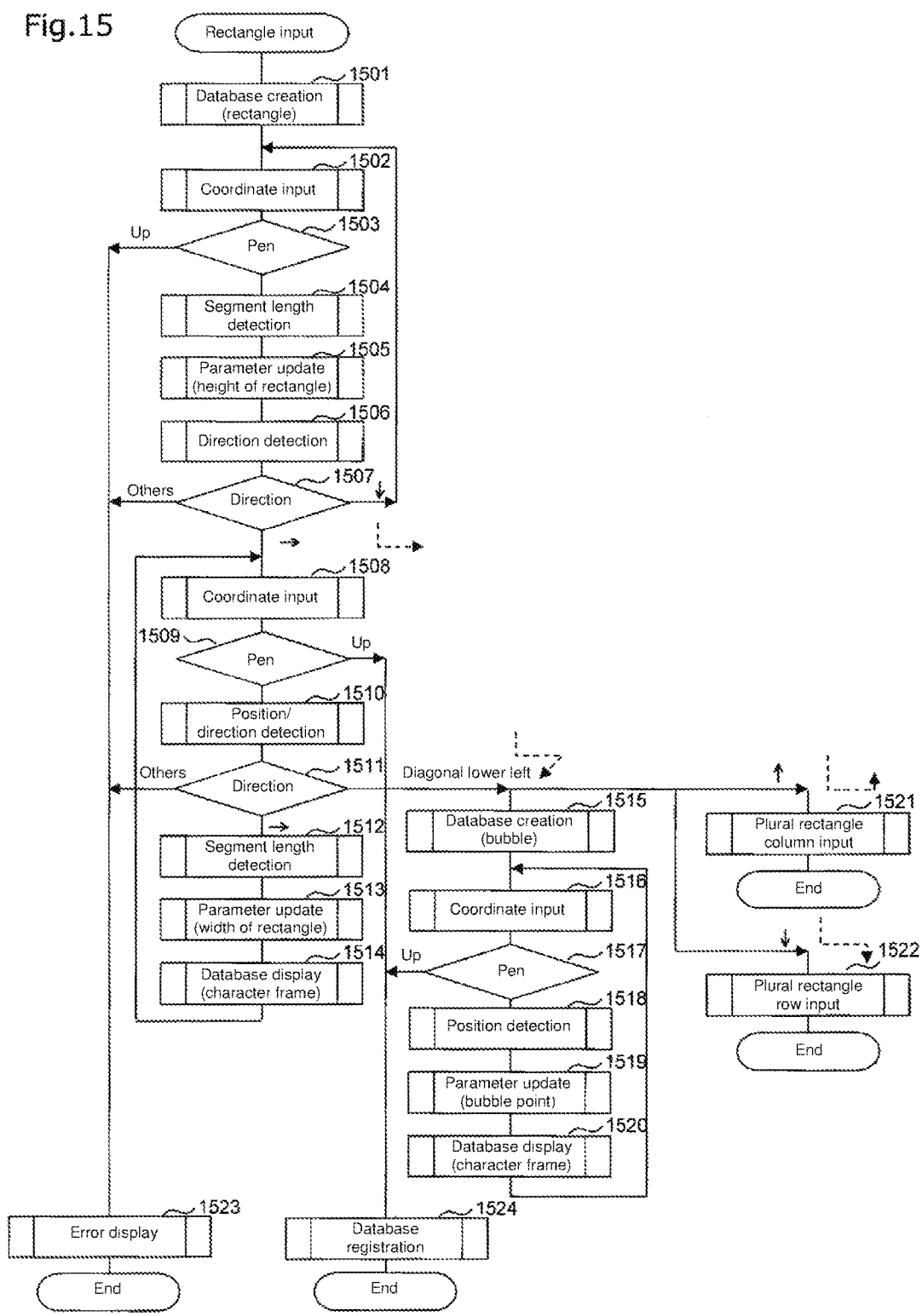
FIG. 15 is a flowchart showing processing by the rectangle creation command and the bubble creation command.

FIG. 15 is a flowchart showing a processing procedure for the rectangle creation command and the bubble creation command. After the processing proceeds to the rectangle input 1316 of FIG. 13, a database, which defines a figure (rectangle) illustrated in FIG. 24, is created in database creation 1501 of FIG. 15. At this time, a position detected in the position/direction detection 1302, for example, the position of the starting point of the first segment is stored in the database.

After the database creation 1501, the processing proceeds to coordinate input 1502, segment length detection 1504, parameter update 1505 and direction detection 1506. In the segment length detection 1504, the length of the vertical segment of the command, that is, the height of the rectangle is detected. In the parameter update 1505, the parameter (height of the figure) of the above-described database is updated. When it is determined that the pen, the finger or the like is lifted on the way ("up" in pen-up determination 1503), it is determined that the command is unrecognizable, and the command error is displayed on the display screen 6 in error display 1523.

When it is determined in the direction determination 1507 that the direction detected in the direction detection 1506 is the downward direction (that is, no change occurs), the processing returns to the coordinate input 1502, and in a case where it is determined that the detected direction is the right direction, the processing proceeds to coordinate input 1508, position/direction detection 1510 and segment length detection 1512, and the length of the horizontal segment of the command, that is, the width of the rectangle is detected. In parameter update 1513 which follows, the parameter (width of the figure) of the above-described database is updated by the detected width of the rectangle, and in database display 1514, a figure with the updated position and size is displayed on the display screen 6. At the same time, a character frame capable of receiving input is displayed in the figure. Thereafter, the processing returns to the coordinate input 1508. When it is determined that the pen, the finger or the like is lifted on the way ("$_{up}$" in pen-up determination 1509), it is determined that the input of the command is ended, and the above-described database is registered in database registration 1524.

In a case where it is determined in the direction determination 1511 that the direction detected in the position/direction detection 1510 is the upward direction, it is recognized that the inputted command is a plural rectangle column creation command, and the processing proceeds to plural rectangle column input 1521, and in a case where it is determined that the detected direction is the downward direction, it is recognized that the inputted command is a plural rectangle row creation command, and the processing proceeds to plural rectangle row input 1522. In a case where it is determined that the detected direction is the lower left diagonal direction, it is recognized that the inputted command is a bubble creation command, and in database creation 1515, a database that defines a bubble illustrated in FIG. 25 is created. At this time, the position of the rectangle which is detected in the position/direction detection 1320, the height of the rectangle, which is detected in the segment length detection 1504, and the width of the rectangle, which is detected in the segment length detection 1510, are stored in the database.

After the database creation 1515, the processing proceeds to coordinate input 1516, position detection 1518 and parameter update 1519. In the parameter update 1519, the parameter (position of the bubble) in the above-described database is updated by the position detected in the position detection 1518. Moreover, in database display 1520, a bubble, which has a position and a size, both being based on the values recorded in the database, and is accompanied with the character frame capable of receiving input, is displayed on the display screen 6. Thereafter, the processing returns to the coordinate input 1516. When it is determined that the pen, the finger or the like is lifted on the way ("up" in pen-up determination 1517), it is determined that the input of the command is ended, and the above-described database is registered in database registration 1524.

Figure 16:
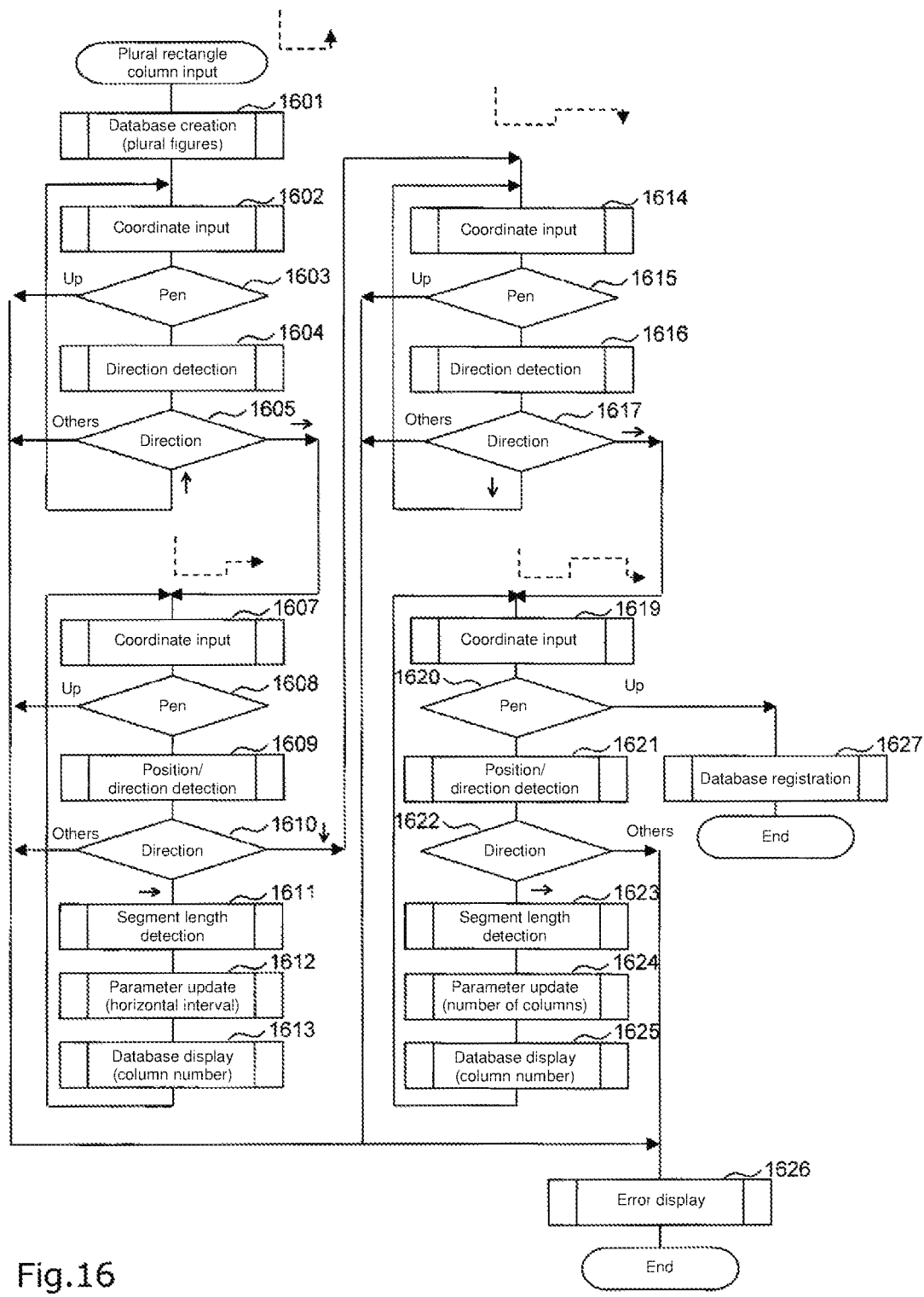
FIG. 16 is a flowchart showing processing by the plural rectangle column creation command.

FIG. 16 is a flowchart showing a processing procedure for the plural rectangle column creation command. After the processing proceeds to the plural rectangle column input 1521 of FIG. 15, a database, which defines plural figures (rectangles) illustrated in FIG. 26, is created in database creation 1601 of FIG. 16. At this time, the position of the rectangle which is detected in the position/direction detection 1320, the height of the rectangle, which is detected in the segment length detection 1504, and the width of the rectangle, which is detected in the segment length detection 1510, are stored in the database, and in addition, the number of rectangles in the vertical direction is set to 1 as an initial value.

After the database creation 1601, the processing proceeds to coordinate input 1602 and direction detection 1604, and new direction detection is performed. When it is determined in the direction determination 1605 that the direction detected in the direction detection 1604 is the upward direction (that is, no change occurs), the processing returns to the coordinate input 1602, and in a case where it is determined that the detected direction is the right direction, the processing proceeds to coordinate input 1607, position/direction detection 1609, segment length detection 1611, parameter update 1612 and database display 1613, and thereafter, returns to the coordinate input 1607. In the segment length detection 1611, a length of a horizontal segment of the inputted command is detected as a horizontal interval of the rectangle to be created. In the parameter update 1612, the parameter (horizontal interval) in the above-described database is updated by the detected value. In the database display 1613, columns of the rectangles at the updated horizontal interval are displayed on the display screen 6 in a mode of column numbers being added. When it is determined that the pen, the finger or the like is lifted on the way ("up" in pen-up determination 1608), it is determined that the command is unrecognizable, and the command error is displayed on the display screen 6 in error display 1626.

Next, in a case where it is determined in the direction determination 1610 that the direction detected in the direction detection 1609 is the downward direction, the processing proceeds to coordinate input 1614 and direction detection 1616, and new direction detection is performed. When it is determined in the direction determination 1617 that the direction detected in the direction detection 1616 is the downward direction (that is, no change occurs), the processing returns to the coordinate input 1614, and in a case where it is determined that the detected direction is the right direction, the processing proceeds to coordinate input 1619, position/direction detection 1621, segment length detection 1623, parameter update 1624 and database display 1625, and thereafter, returns to the coordinate input 1619. In the parameter update 1624, the parameter (number of columns, that is, the number in the horizontal direction) in the above-described database is updated by a value, which is a sum of 2 as an additive and a value obtained by dividing a length of the segment, which is detected in the segment length detection 1623, by the horizontal interval of the figure, which is detected in the segment length detection 1611 and recorded in a database of FIG. 26, that is, by the number of columns. In the database display 1624, rectangles of the updated number of columns are displayed on the display screen 6 in a mode of column numbers being added. When it is determined that the pen, the finger or the like is lifted on the way ("up" in pen-up determination 1620), it is determined that the input of the command is ended, and the above-described database is registered in database registration 1627. In a case where such determinations of "others" are made in the direction determinations 1605, 1610, 1617 and 1622, and in a case where such determinations of "up" are made in the pen-up determinations 1603 and 1615, it is determined that the command is unrecognizable, and the command error is displayed on the display screen 6 by error display 1626.

Figure 17:
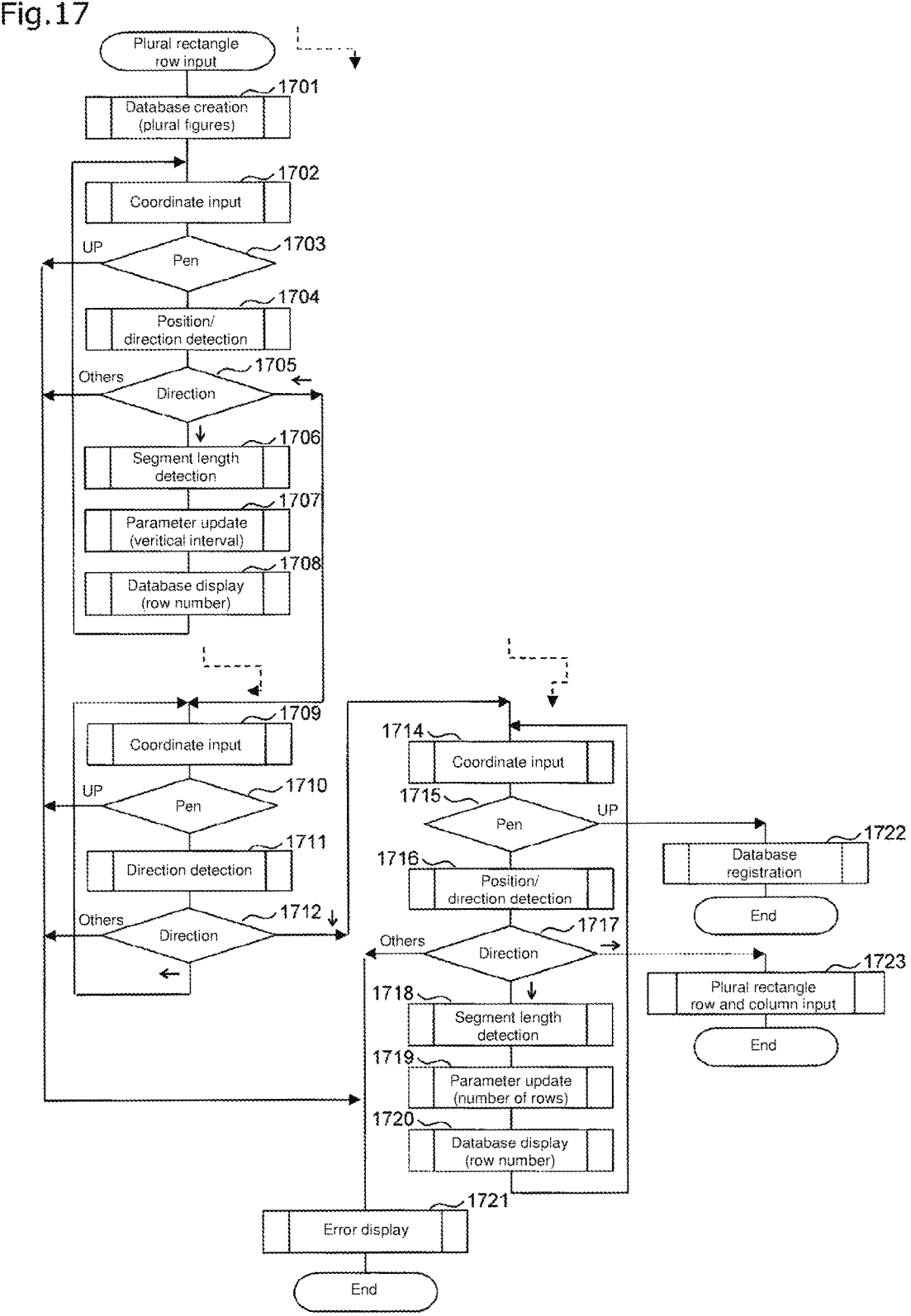
FIG. 17 is a flowchart showing processing by the plural rectangle row creation command.

FIG. 17 is a flowchart showing a processing procedure for the plural rectangle row creation command. After the processing proceeds to the plural rectangle row input 1522 of FIG. 15, a database, which defines plural figures (rectangles) illustrated in FIG. 26, is created in database creation 1701 of FIG. 17. At this time, the position of the rectangle which is detected in the position/direction detection 1320, the height of the rectangle, which is detected in the segment length detection 1504, and the width of the rectangle, which is detected in the segment length detection 1510, are stored in the database, and in addition, the number of rectangles in the horizontal direction is set to 1 as an initial value.

After the database creation 1701, the processing proceeds to coordinate input 1702, position/direction detection 1704, segment length detection 1706, parameter update 1707 and database display 1708, and thereafter, returns to the coordinate input 1702. In the segment length detection 1706, a length of a vertical segment of the inputted command is detected as a vertical interval of the rectangle to be created. In the parameter update 1707, the parameter (vertical interval) in the above-described database is updated by the detected value. In the database display 1708, columns of the rectangles at the updated vertical interval are displayed on the display screen 6 in a mode of row numbers being added. When it is determined that the pen, the finger or the like is lifted on the way ("up" in pen-up determination 1703), it is determined that the command is unrecognizable, and the command error is displayed on the display screen 6 in error display 1721.

Next, in a case where it is determined in the direction determination 1705 that the direction detected in the direction detection 1704 is the left direction, the processing proceeds to coordinate input 1709 and direction detection 1711, and new direction detection is performed. When it is determined in the direction determination 1712 that the detected direction is the left direction (that is, no change occurs), the processing returns to the coordinate input 1709, and in a case where it is determined that the detected direction is the downward direction, the processing proceeds to coordinate input 1714, position/direction detection 1716, segment length detection 1718, parameter update 1719 and database display 1720, and thereafter, returns to the coordinate input 1714. In the parameter update 1718, the parameter (number of rows, that is, the number in the vertical direction) of the above-described database is updated by a value, which is a sum of 2 as an additive and a value obtained by dividing a length of the segment, which is detected in the segment length detection 1718, by the vertical interval of the figure, which is detected in the segment length detection 1706 and is recorded in the database of FIG. 26, that is, by the number of rows. In the database display 1720, rectangles of the updated number of rows are displayed on the display screen 6 in a mode of row numbers being added. When it is determined that the pen, the finger or the like is lifted on the way ("up" in pen-up determination 1715), it is determined that the input of the command is ended, and the above-described database is registered in database registration 1722.

In a case where it is determined in direction determination 1717 that the direction detected in the position/direction detection 1716 is the right direction, it is recognized that the inputted command is a plural rectangle row and column input command, and the processing proceeds to plural rectangle row and column input 1723. In a case where such determinations of "others" are made in the direction determinations 1705, 1712 and 1717, and in a case where such a determination of "up" is made in the pen-up determination 1710, it is determined that the command is unrecognizable, and the command error is displayed on the display screen 6 in error display 1721.

Figure 18:
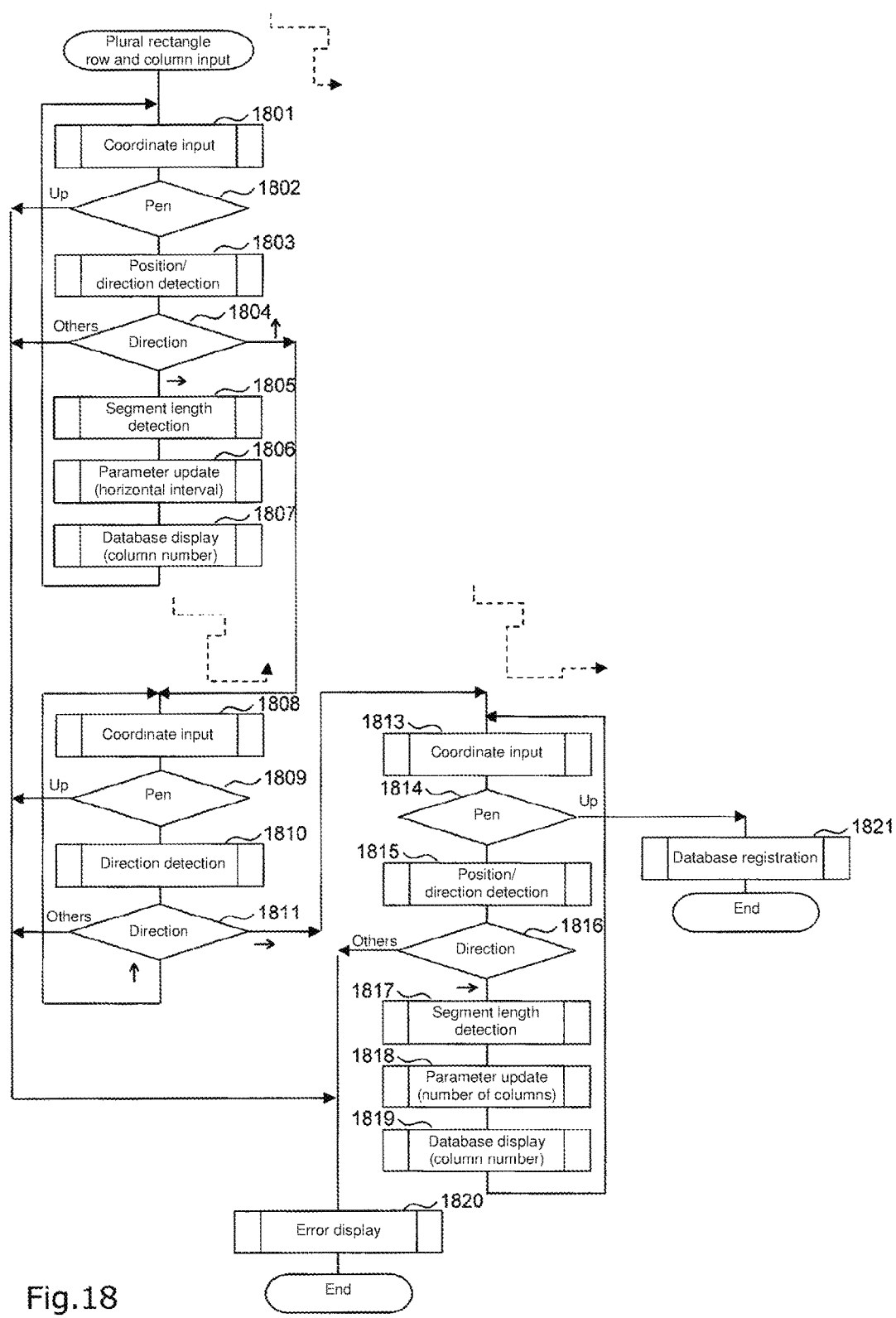
FIG. 18 is a flowchart showing processing by the plural rectangle row and column creation command.

FIG. 18 is a flowchart showing a processing procedure for the plural rectangle row and column creation command. After proceeding to the plural rectangle row and column input 1723 of FIG. 17, the processing proceeds to coordinate input 1801, position/direction detection 1803, segment length detection 1805, parameter update 1806 and database display 1807 of FIG. 18. Thereafter, the processing returns to the coordinate input 1801. In the segment length detection 1805, a length of a horizontal segment of the inputted command is detected as a horizontal interval of the rectangle to be created. In the parameter update 1806, the parameter (horizontal interval) in the above-described database (FIG. 26) is updated by the detected value. In the database display 1807, rectangles are displayed on the display screen 6 in a mode of column numbers being added. When it is determined that the pen, the finger or the like is lifted on the way ("up" in pen-up determination 1802), it is determined that the command is unrecognizable, and the command error is displayed on the display screen 6 in error display 1820.

Next, in a case where it is determined in the direction determination 1804 that the direction detected in the position/direction detection 1803 is the upward direction, the processing proceeds to coordinate input 1808 and direction detection 1810, and new direction detection is performed. When it is determined in the direction determination 1811 that the detected direction is the upward direction (that is, no change occurs), the processing returns to the coordinate input 1808, and in a case where it is determined that the detected direction is the right direction, the processing proceeds to coordinate input 1813, position/direction detection 1815, segment length detection 1817, parameter update 1818 and database display 1819. Thereafter, the processing returns to the coordinate input 1813. In the parameter update 1818, the parameter (number of columns, that is, the number in the horizontal direction) in the above-described database is updated by a value, which is a sum of 2 as an additive and a value obtained by dividing a length of the segment, which is detected in the segment length detection 1817, by the horizontal interval of the figure, which is detected in the segment length detection 1805 and is recorded in the database of FIG. 26, that is, by the number of columns. In the database display 1820, rectangles of the number of columns, which is updated based on the updated database (FIG. 26), and of the number of rows, which is calculated by the processing of FIG. 17, are displayed on the display screen 6 in a mode of column numbers being added. When it is determined that the pen, the finger or the like is lifted on the way ("up" in pen-up determination 1814), it is determined that the input of the command is ended, and the above-described database is registered in database registration 1821. In a case where such determinations of "others" are made in the direction determinations 1804, 1811 and 1816, and in a case where such a determination of "up" is made in the pen-up determination 1809, it is determined that the command is unrecognizable, and the command error is displayed on the display screen 6 in error display 1820.

Figure 19:
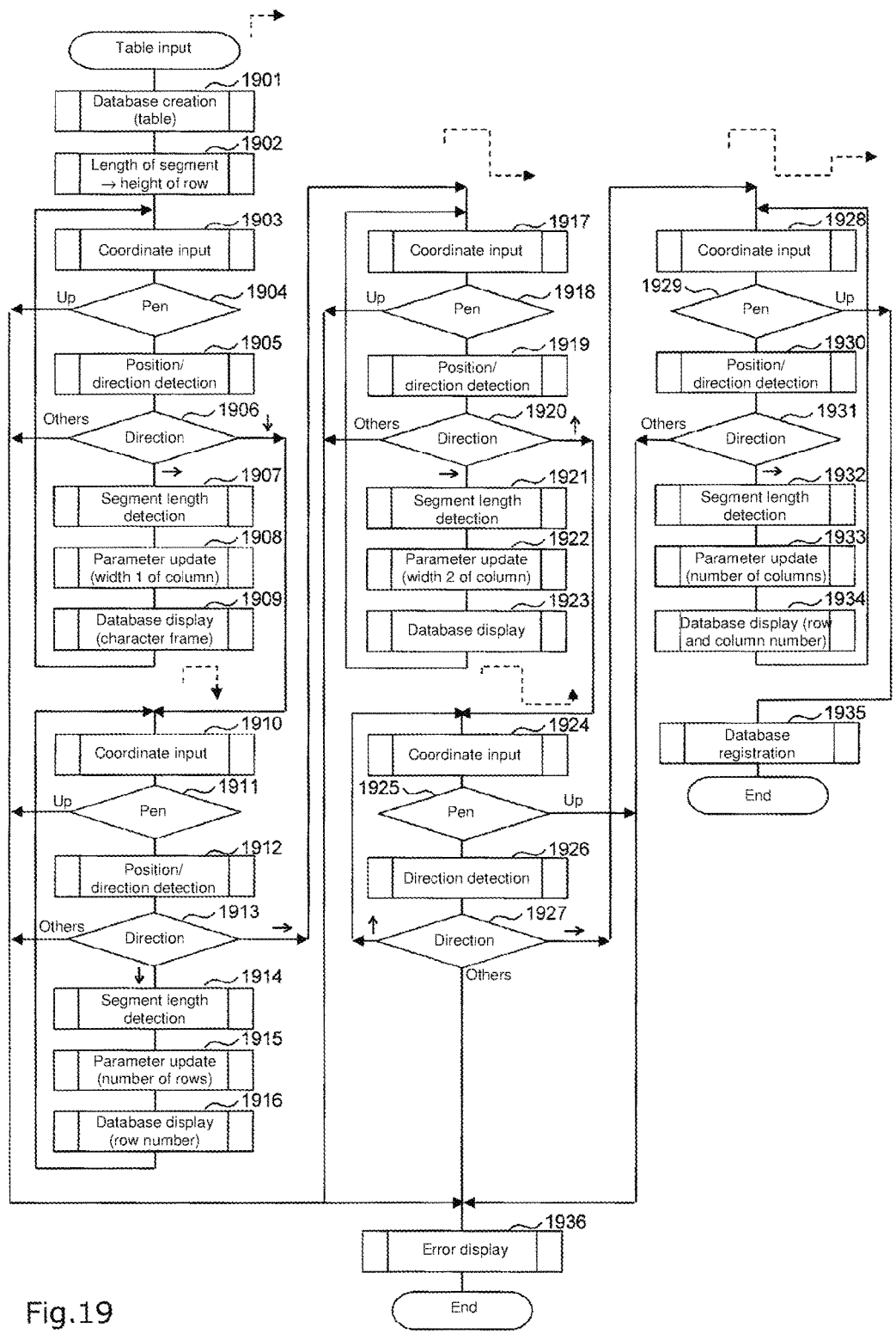
FIG. 19 is a flowchart showing processing by the table creation command.

FIG. 19 is a flowchart showing a processing procedure for the table creation command. After the processing proceeds to the table input 1322 of FIG. 13, a database, which defines a table and is illustrated in FIG. 27, is created in database creation 1901 of FIG. 19. At this time, the position of the starting point of the second polygonal line, which is detected in the position/direction detection 1320 (FIG. 13), is stored as the position of the table in the database. Moreover, in processing 1902, the segment length detected in the segment length detection 1319 (FIG. 13) is stored as the height of the row in the database.

After the database creation 1901, the processing proceeds to coordinate input 1903, position/direction detection 1905, segment length detection 1907, parameter update 1908 and database display 1909. In the parameter update 1908, the parameter (width 1 of the column) of the above-described database is updated by a length of the horizontal segment, which is detected in the segment length detection 1907, that is, by the width of the first column. In the database display 1909, a size of the cell is displayed on the display screen 6. Thereafter, the processing returns to the coordinate input 1903. When it is determined that the pen, the finger or the like is lifted on the way ("up" in pen-up determination 1904), it is determined that the command is unrecognizable, and the command error is displayed on the display screen 6 in error display 1936.

In a case where it is determined in the direction determination 1906 that the direction detected in the position/direction detection 1905 is the downward direction, the processing proceeds to coordinate input 1910, position/direction detection 1912, segment length detection 1914, parameter update 1915 and database display 1916. Thereafter, the processing returns to the coordinate input 1910. In the parameter update 1915, the parameter (number of rows) of the above-described database is updated by a value obtained by dividing a length of the vertical segment, which is detected in the segment length detection 1914, by the height of the row, that is, by the number of rows. In the database display 1916, such cells of the updated number of rows are displayed on the display screen 6 in a mode of row numbers being added. When it is determined that the pen, the finger or the like is lifted on the way ("up" in pen-up determination 1911), it is determined that the command is unrecognizable, and the command error is displayed on the display screen 6 in error display 1936.

In a case where it is determined in the direction determination 1913 that the direction detected in the position/direction detection 1912 is the right direction, the processing proceeds to coordinate input 1917, position/direction detection 1919, segment length detection 1921, parameter update 1922 and database display 1923. Thereafter, the processing returns to the coordinate input 1917. In the segment length detection 1921, a length of the horizontal segment of the inputted command, that is, widths of the second and subsequent columns are detected. In the parameter update 1922, the parameter (width 2 of the column) of the above-described database is updated by the detected value, and in the database display 1923, a table with column numbers added is displayed on the display screen 6. When it is determined that the pen, the finger or the like is lifted on the way ("up" in pen-up determination 1918), it is determined that the command is unrecognizable, and the command error is displayed on the display screen 6 in error display 1936.

In a case where it is determined in the determination of 1920 that the direction detected in the position/direction detection 1919 is the upward direction, the processing proceeds to coordinate input 1924 and direction detection 1926, and next direction detection is performed. When it is determined in the determination of 1927 that the direction detected in the direction detection 1926 is the upward direction (that is, no change occurs), the processing returns to the coordinate input 1924, and in a case where it is determined that the detected direction is the right direction, the processing proceeds to coordinate input 1928, position/direction detection 1930, segment length detection 1932, parameter update 1933 and database display 1934. Thereafter, the processing returns to the coordinate input 1928. In the parameter update 1933, the parameter (number of columns) of the above-described database is updated by a value, which is a sum of 2 as an additive and a value obtained by dividing a length of the segment, which is detected in the segment length detection 1932, by each of the widths of the second and subsequent columns, which is detected in the above-described processing and is recorded in the database, that is, by the number of columns. In the database display 1934, the table is displayed on the display screen 6 in a mode of cells of the updated number of columns having column numbers being added. When it is determined that the pen, the finger or the like is lifted on the way ("up" in pen-up determination 1929), it is determined that the input of the command is ended, and the above-described database is registered in database registration 1935. In a case where such determinations of "others" are made in the direction determinations 1906, 1913, 1920, 1927 and 1931, and in a case where such a determination of "up" is made in the pen-up determination 1918, it is determined that the command is unrecognizable, and the command error is displayed on the display screen 6 by error display 1936.

The present application is based on Japanese Patent Application No. 2014-101282 filed to Japan by the applicant thereof on May 15, 2014, and the entire contents of which are incorporated herein by reference.

The above descriptions regarding the specific embodiment of the present invention are presented for the purpose of illustration. These are not intended to be exhaustive or to limit the present invention directly to the described embodiment. It is obvious for those skilled in the art that numerous modifications and alterations are possible in light of the content described above.

DESCRIPTION OF REFERENCE SIGNS

1: Coordinate input device
3: Display device
6: Display screen
4: Program memory
5: Data memory
10: Information processing device
31: Horizontal writing text box creation command
32, 33: Guideline
41: Vertical writing text box creation command
42, 43: Guideline
51: Itemized/horizontal writing text box creation command
52, 55: Guideline
53: Paragraph mark
54: Length of fourth segment
61: Itemized/vertical writing text box creation command 61
62, 65: Guideline
70: Character frame
71: Rectangle creation command
72: Rectangle
80: Character frame
81: Rectangular bubble creation command
82: Rectangle
90: Character frame
91: Plural column rectangle creation command
92, 94, 96, 98: Rectangle
95, 97, 99: Column number
910: Length of fourth segment
911: Length of sixth segment
100: Character frame
101: Plural row rectangle creation command
102, 104, 106, 108: Rectangle
103: Row number/column number
105, 107, 109: Column number
1011: Length of fifth segment
110: Character frame
111: Plural row and column rectangle creation command
112, 114, 116, 118, 1110, 1112, 1113, 1114: Rectangle
113, 115, 117, 119, 1111: Column number
1140: Length of third segment
1141: Length of fifth segment
1142: Length of sixth segment
1143: Length of eighth segment
120: Character frame
121: Table creation command
122: Table
123 to 127: Row number
128, 129, 1210: Column number
1230: Length of third segment
1231: Length of fourth segment
1233: Length of sixth segment
201: Coordinate input unit
201: Direction input unit
204: Error display unit
203: Command recognition unit
205: Database creation unit
206: Position detection unit
207: Segment length detection unit
208: Parameter extraction unit
209: Database registration unit
210: Database display unit
211: Guideline display unit
212: Database update unit
253: Command execution unit

The invention claimed is:

1. An information processing device comprising:
a command recognition unit that specifies one of one or more pieces of object creation processing, which include at least one of (i) text box creation processing for creating a text box, the text box being an area into which characters are to be entered, (ii) figure creation processing for creating a figure, the figure having a two-dimensional area, and (iii) table creation processing for creating a table, from a combination of directions where one polygonal line is bent, the one polygonal line being inputted as a handwriting input command to a handwriting input device that enables handwriting input onto a display screen;
a parameter extraction unit that extracts, from a position and length of a segment composing the one polygonal line, a parameter, which corresponds to the specified object creation processing, among parameters which correspond to the one or more pieces of object creation processing and include at least one set of parameters corresponding to the at least one object creation processing out of (i) a position and size of the text box in the text box creation processing, (ii) a position and size of the figure in the figure creation processing, and (iii) a position of the table, a height of a row, a width of a column, a number of rows and a number of columns in the table creation processing; and
a command execution unit that executes the object creation processing, which is specified by the command recognition unit, based on the parameter extracted by the parameter extraction unit, and displays a created object on the display screen,
wherein
the text box creation processing includes horizontal writing text box creation processing for creating a horizontal writing text box;
when there is made an input of a polygonal line made of a series of two segments, which are a first segment going from right to left and a second segment continuous with the first segment and bent downward, the command recognition unit specifies the horizontal writing text box creation processing, and from a position and length of the second segment, the parameter extraction unit extracts a position and vertical width of a text box, which is to be created, as parameters corresponding to the horizontal writing text box creation processing, wherein the figure creation processing includes single figure creation processing for creating a single figure, when there is made an input of a polygonal line made of a series of two segments, which are a first segment going downward from above and a second segment continuous with the first segment and bent rightward, the command recognition unit specifies the single figure creation processing, and from a position and length of the first segment, the parameter extraction unit extracts a position and vertical width of a single figure, which is to be created, as parameters corresponding to the single figure creation processing, and in addition, from a length of the second segment, extracts a horizontal width of the single figure, which is to be created, and wherein the command recognition unit specifies the table creation processing when there is made an input of a polygonal line made of a series of two segments, which are a first segment going upward from below and a second segment continuous with the first segment and bent rightward, and the parameter extraction unit extracts, as parameters corresponding to the table creation processing, a position of a first row and a first column in the table to be created and a height common to each of the plural rows of the table from a position and length of the first segment, extracts a horizontal width of a first column of the table from a length of the second segment, and in addition, when there is made an input of a third segment bent downward continuously with the second segment from which the table creation processing is specified, extracts a number of rows of the table from a length of the third segment, when there is made an input of a fourth segment bent rightward continuously with the third segment, extracts a horizontal width of a second and subsequent columns to the second column of the table from a length of the fourth segment, and when there is made an input of a fifth segment bent upward continuously with the fourth segment and a sixth segment bent rightward continuously with the fifth segment, extracts a number of columns of the table from a length of the sixth segment.

2. The information processing device according to claim 1, wherein, even while one polygonal line as the handwriting input command is being inputted, the command recognition unit specifies the one of the one or more pieces of the object creation processing based on the one polygonal line that is being inputted, even while the one polygonal line as the handwriting input command is being inputted, the parameter extraction unit extracts the parameter, which corresponds to the specified object creation processing, from a position and length of a segment composing the one polygonal line that is being inputted; and even while the one polygonal line as the handwriting input command is being inputted, the command execution unit executes the object creation processing, which is specified by the command recognition unit, based on the parameter extracted by the parameter extraction unit, and displays the created object on the display screen.

3. The information processing device according to claim 1, wherein the text box creation processing includes vertical writing text box creation processing for creating a vertical writing text box, when there is made an input of a polygonal line made of a series of two segments, which are a first segment going upward from below and a second segment continuous with the first segment and bent leftward, the command recognition unit specifies the vertical writing text box creation processing, and from a position and length of the second segment, the parameter extraction unit extracts a position and horizontal width of a text box, which is to be created, as parameters corresponding to the vertical writing text box creation processing.

4. The information processing device according to claim 1, wherein the text box creation processing includes itemized/horizontal writing text box creation processing for creating an itemized/horizontal writing text box, when there is made an input of a polygonal line made of a series of three segments, which are a first segment going from right to left, a second segment continuous with the first segment and bent downward, and a third segment continuous with the second segment and bent rightward, the command recognition unit specifies the itemized/horizontal writing text box creation processing, and from a position and length of the second segment, the parameter extraction unit extracts a position and vertical width of a first stage of an itemized/horizontal writing text box, which is to be created, as parameters corresponding to the itemized/horizontal writing text box creation processing, and in addition, when there is made an input of a fourth segment bent downward continuously with the third segment from which the itemized/horizontal writing text box creation processing is specified, extracts, as the parameter, a number of stages of a text box having a same vertical width as the first stage from a length of the fourth segment.

5. The information processing device according to claim 4, wherein, in a case where the command recognition unit specifies the itemized/horizontal writing text box creation processing, the command execution unit creates the itemized/horizontal writing text box based on the parameters extracted by the parameter extraction unit as ones which correspond to the specified itemized/horizontal writing text box creation processing, and in addition, creates a stage number of each stage at a position adjacent to a head of each stage, and displays the created stage number of each stage on the display screen together with the created itemized/horizontal writing text box.

6. The information processing device according to claim 1, wherein the text box creation processing includes itemized/vertical writing text box creation processing for creating an itemized/vertical writing text box, when there is made an input of a polygonal line made of a series of three segments, which are a first segment going upward from below, a second segment continuous with the first segment and bent leftward, and a third segment continuous with the second segment and bent downward, the command recognition unit specifies the itemized/vertical writing text box creation processing, and from a position and length of the second segment, the parameter extraction unit extracts a position and horizontal width of a first stage of an itemized/vertical writing text box, which is to be created, as parameters corresponding to the itemized/vertical writing text box creation processing, and in addition, when there is made an input of a fourth segment bent leftward continuously with the third segment from which the itemized/vertical writing text box creation processing is specified, extracts, as the parameter, a number of stages of a text box having a same horizontal width as the first stage from a length of the fourth segment.

7. The information processing device according to claim 6, wherein, in a case where the command recognition unit specifies the itemized/vertical writing text box creation processing, the command execution unit creates the itemized/vertical writing text box based on the parameters extracted by the parameter extraction unit as ones which correspond to the specified itemized/vertical writing text box creation processing, and in addition, creates a stage number of each stage at a position adjacent to a head of each stage, and displays the created stage number of each stage on the display screen together with the created itemized/vertical writing text box.

8. The information processing device according to claim 1, wherein, in a case where the command recognition unit specifies the single figure creation processing, the command execution unit creates the single figure based on the parameters extracted by the parameter extraction unit as ones which correspond to the specified single figure creation processing, and in addition, creates a character frame, which indicates a number of characters capable of being inputted into the single figure which is to be created, in the single figure to be created, and displays the created character frame on the display screen together with the created single figure.

9. The information processing device according to claim 1, wherein the figure creation processing includes bubble figure creation processing for creating a bubble figure, when there is made an input of a polygonal line made of a series of three segments, which are a first segment going downward from above, a second segment continuous with the first segment and bent rightward and a third segment continuous with the second segment and bent in a diagonal lower left direction, the command recognition unit specifies the bubble figure creation processing, and from a position and length of the first segment, the parameter extraction unit extracts a position and vertical width of a body portion of a bubble figure, which is to be created, as parameters corresponding to the bubble figure creation processing, in addition, from a length of the second segment, extracts a horizontal width of the body portion of the bubble figure, which is to be created, and from a position of an end point of the third segment, extracts a position of a tip end portion of a drawn portion of the bubble figure to be created.

10. The information processing device according to claim 9, wherein, in a case where the command recognition unit specifies the bubble figure creation processing, the command execution unit creates the bubble figure based on the parameters extracted by the parameter extraction unit as ones which correspond to the specified bubble figure creation processing, and in addition, creates a character frame, which indicates a number of characters capable of being inputted into the body portion of the bubble figure which is to be created, in the body portion of the bubble figure to be created, and displays the created character frame on the display screen together with the created bubble figure.

11. The information processing device according to claim 1, wherein the figure creation processing includes plural column figure creation processing for creating plural column figures which are arrayed horizontally at an equal interval and have a same shape and a same size, when there is made an input of a polygonal line made of a series of three segments, which are a first segment going downward from above, a second segment continuous with the first segment and bent rightward and a third segment continuous with the second segment and bent upward, the command recognition unit specifies the plural column figure creation processing, and the parameter extraction unit extracts, as parameters corresponding to the plural column figure creation processing, a position of a first figure of the plural column figures to be created and a vertical width common to each of the plural column figures from a position and length of the first segment, extracts a horizontal width common to each of the plural column figures from a length of the second segment, and in addition, when there is made an input of a fourth segment bent rightward continuously with the third segment from which the plural column figure creation processing is specified, extracts the interval between the plural column figures from a length of the fourth segment, and when there is made an input of a fifth segment bent downward continuously with the fourth segment, and further, there is made an input of a sixth segment bent rightward continuously with the fifth segment, extracts a number of the plural column figures from a length of the sixth segment.

12. The information processing device according to claim 1, wherein the figure creation processing includes plural row figure creation processing for creating plural row figures which are arrayed vertically at an equal interval and have a same shape and a same size, when there is made an input of a polygonal line made of a series of three segments, which are a first segment going downward from above, a second segment continuous with the first segment and bent rightward and a third segment continuous with the second segment and bent downward, the command recognition unit specifies the plural row figure creation processing, and the parameter extraction unit extracts, as parameters corresponding to the plural row figure creation processing, a position of a first figure of the plural row figures to be created and a vertical width common to each of the plural row figures from a position and length of the first segment, extracts a horizontal width common to each of the plural row figures from a length of the second segment, and in addition, extracts an interval of the plural row figures from a length of the third segment, and when there is made an input of a fourth segment bent leftward continuously with the third segment from which the plural row figure creation processing is specified, and further, there is made an input of a fifth segment bent downward continuously with the fourth segment, extracts a number of the plural row figures from a length of the fifth segment.

13. The information processing device according to claim 1,
wherein the figure creation processing includes plural row and column figure creation processing for creating plural row and column figures which are arrayed vertically and horizontally at an equal interval and have a same shape and a same size,
when there is made an input of a polygonal line made of a series of six segments, which are a first segment going downward from above, a second segment continuous with the first segment and bent rightward, a third segment continuous with the second segment and bent downward, a fourth segment continuous with the third segment and bent leftward, a fifth segment continuous with the fourth segment and bent downward and a sixth segment continuous with the fifth segment and bent rightward, the command recognition unit specifies the plural row and column figure creation processing, and
the parameter extraction unit extracts, as parameters corresponding to the plural row and column figure creation processing, a position of a figure of a first row and a first column in the plural row and column figures to be created and a vertical width common to each of the plural row and column figures from a position and length of the first segment, extracts a horizontal width common to each of the plural row and column figures from a length of the second segment, extracts a vertical interval between the plural row and column figures from a length of the third segment, extracts a number of rows of the plural row and column figures from a length of the fifth segment, extracts a horizontal interval between the plural row and column figures from a length of the sixth segment, and in addition, when there is made an input of a seventh segment bent upward continuously with the sixth segment from which the plural row and column figure creation processing is specified, and further, there is made an input of an eight segment bent rightward continuously with the seventh segment, extracts a number of columns of the plural row and column figures from a length of the eighth segment.

14. The information processing device according to claim 1,
wherein the command recognition unit specifies one of plural pieces of object creation processing including the text box creation processing, the figure creation processing and the table creation processing, and
the parameter extraction unit extracts parameters, which correspond to the specified object creation processing, among parameters which correspond to the plural pieces of the object creation processing and include the position and size of the text box in the text box creation processing, the position and size of the figure in the figure creation processing, and the position of the table, the height of the row, the width of the column, the number of rows and the number of columns in the table creation processing.

15. The information processing device according to claim 1, further comprising a handwriting input device including a display screen, wherein the handwriting input device enables handwriting input, including input of the handwriting input command, onto the display screen and displays the created object on the display screen.

16. A non-transitory computer readable medium storing a program for causing, when executed by a computer, the computer to function as:
a command recognition unit that specifies one of one or more pieces of object creation processing, which include at least one of (i) text box creation processing for creating a text box, the text box being an area into which characters are to be entered, (ii) figure creation processing for creating a figure, the figure having a two-dimensional area, and (iii) table creation processing for creating a table, from a combination of directions where one polygonal line is bent, the one polygonal line being inputted as a handwriting input command to a handwriting input device that enables handwriting input onto a display screen;
a parameter extraction unit that extracts, from a position and length of a segment composing the one polygonal line, a parameter, which corresponds to the specified object creation processing, among parameters which correspond to the one or more pieces of object creation processing and include at least one set of parameters corresponding to the at least one object creation processing out of (i) a position and size of the text box in the text box creation processing, (ii) a position and size of the figure in the figure creation processing, and (iii) a position of the table, a height of a row, a width of a column, a number of rows and a number of columns in the table creation processing; and
a command execution unit that executes the object creation processing, which is specified by the command recognition unit, based on the parameter extracted by the parameter extraction unit, and displays a created object on the display screen,
wherein
the text box creation processing includes horizontal writing text box creation processing for creating a horizontal writing text box;
when there is made an input of a polygonal line made of a series of two segments, which are a first segment going from right to left and a second segment continuous with the first segment and bent downward, the command recognition unit specifies the horizontal writing text box creation processing, and
from a position and length of the second segment, the parameter extraction unit extracts a position and vertical width of a text box, which is to be created, as parameters corresponding to the horizontal writing text box creation processing,
wherein
the figure creation processing includes single figure creation processing for creating a single figure,
when there is made an input of a polygonal line made of a series of two segments, which are a first segment going downward from above and a second segment continuous with the first segment and bent rightward, the command recognition unit specifies the single figure creation processing, and
from a position and length of the first segment, the parameter extraction unit extracts a position and vertical width of a single figure, which is to be created, as parameters corresponding to the single figure creation processing, and in addition, from a length of the second segment, extracts a horizontal width of the single figure, which is to be created, and
wherein
the command recognition unit specifies the table creation processing when there is made an input of a polygonal line made of a series of two segments, which are a first segment going upward from below and a second segment continuous with the first segment and bent rightward, and the parameter extraction unit extracts, as parameters corresponding to the table creation processing, a position of a first row and a first column in the table to be created and a height common to each of the plural rows of the table from a position and length of the first segment, extracts a horizontal width of a first column of the table from a length of the second segment, and in addition, when there is made an input of a third segment bent downward continuously with the second segment from which the table creation processing is specified, extracts a number of rows of the table from a length of the third segment, when there is made an input of a fourth segment bent rightward continuously with the third segment, extracts a horizontal width of a second and subsequent columns to the second column of the table from a length of the fourth segment, and when there is made an input of a fifth segment bent upward continuously with the fourth segment and a sixth segment bent rightward continuously with the fifth segment, extracts a number of columns of the table from a length of the sixth segment.

17. The non-transitory computer readable medium according to claim 16, wherein, even while one polygonal line as the handwriting input command is being inputted, the command recognition unit specifies the one of the one or more pieces of the object creation processing based on the one polygonal line that is being inputted, even while the one polygonal line as the handwriting input command is being inputted, the parameter extraction unit extracts the parameter, which corresponds to the specified object creation processing, from a position and length of a segment composing the one polygonal line that is being inputted; and even while the one polygonal line as the handwriting input command is being inputted, the command execution unit executes the object creation processing, which is specified by the command recognition unit, based on the parameter extracted by the parameter extraction unit, and displays the created object on the display screen.

18. The non-transitory computer readable medium according to claim 16, wherein the command recognition unit specifies one of plural pieces of object creation processing including the text box creation processing, the figure creation processing and the table creation processing, and the parameter extraction unit extracts parameters, which correspond to the specified object creation processing, among parameters which correspond to the plural pieces of the object creation processing and include the position and size of the text box in the text box creation processing, the position and size of the figure in the figure creation processing, and the position of the table, the height of the row, the width of the column, the number of rows and the number of columns in the table creation processing.

* * * * *